(12) United States Patent
Sasaki

(10) Patent No.: US 7,180,569 B2
(45) Date of Patent: Feb. 20, 2007

(54) LIQUID CRYSTAL DEVICE COMPRISING A SECOND ORIENTATION CONTROL ELEMENT CONSTITUTED BY AN ASSEMBLY OF DISTINCT PLURAL ORIENTATION CONTROL ELEMENTS FORMED BETWEEN ADJACENT REPETITIONS OF A FIRST ORIENTATION CONTROL ELEMENT

(75) Inventor: Takahiro Sasaki, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/664,729

(22) Filed: Sep. 18, 2003

(65) Prior Publication Data

US 2004/0061821 A1  Apr. 1, 2004

Related U.S. Application Data

(62) Division of application No. 10/047,216, filed on Jan. 14, 2002.

(30) Foreign Application Priority Data

Feb. 6, 2001 (JP) .............................. 2001-029814

(51) Int. Cl.
G02F 1/1337 (2006.01)
(52) U.S. Cl. .................. 349/191; 349/129; 349/130; 349/178
(58) Field of Classification Search ............... 349/129, 349/128, 123–125, 130, 156, 178, 191, 94
See application file for complete search history.

(56) References Cited

U.S. PATENT DOCUMENTS

| 5,844,649 | A | 12/1998 | Yamahara et al. |
| 6,229,589 | B1 | 5/2001 | Koma |
| 6,424,397 | B1 | 7/2002 | Kuo |
| 6,567,144 | B1 | 5/2003 | Kim et al. |
| 6,593,982 | B2 | 7/2003 | Yoon et al. |
| 6,657,695 | B1 | 12/2003 | Song et al. |
| 6,710,837 | B1 * | 3/2004 | Song et al. ................. 349/143 |
| 6,836,308 | B2 | 12/2004 | Sawasaki et al. |
| 2001/0006408 | A1 | 7/2001 | Matsuyama et al. |
| 2001/0048499 | A1 | 12/2001 | Numano et al. |
| 2003/0202146 | A1 | 10/2003 | Takeda et al. |

* cited by examiner

Primary Examiner—Dung T. Nguyen
Assistant Examiner—Thoi V. Duong
(74) Attorney, Agent, or Firm—Greer, Burns & Crain, Ltd

(57) ABSTRACT

A slit pattern, which is an orientation control element extending in an oblique direction relative to an edge of a pixel electrode on a surface of a TFT substrate, is formed in the pixel electrode to extend in a substantially parallel direction to an extending direction of a bank-shaped pattern. Furthermore, as an orientation control element, fine slit patterns (concave portions in the pixel electrode) are formed locally in a part near the edge of the pixel electrode except in the pixel electrode to extend in an oblique direction relative to an extending direction of the edge.

8 Claims, 27 Drawing Sheets

PLANE VIEW

LIQUID CRYSTAL MOLECULE

WITH A HOLLOW

DARK LINE

WITHOUT A HOLLOW

CONVENTIONAL
FIG. 3B
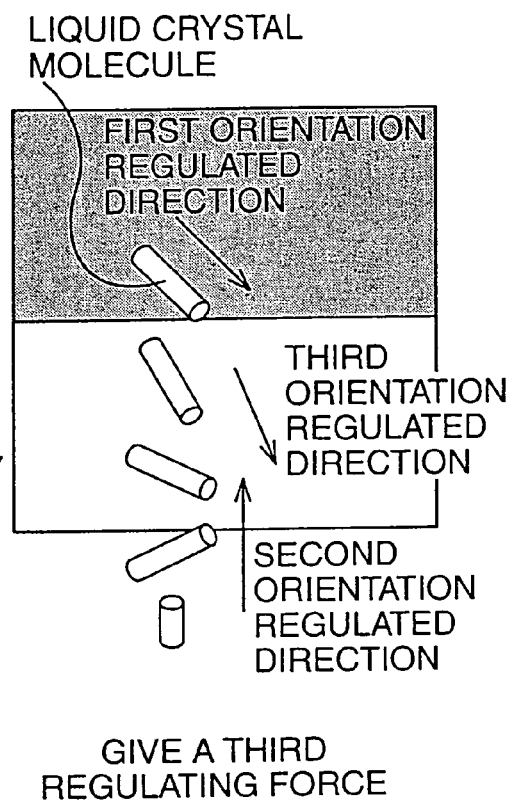
GIVE A THIRD
REGULATING FORCE
RELATION BETWEEN DIRECTIONS OF
ALIGNING FORCE AND ANGLES

APPLIED
VOLTAGE : 3V

APPLIED
VOLTAGE : 4V

APPLIED
VOLTAGE : 5V

APPLIED
VOLTAGE : 6V

APPLIED
VOLTAGE : 7V

APPLIED
VOLTAGE : 8V

FIG. 11

| | ①WITH AN AUXILIARY BANK | ②WITHOUT AN AUXILIARY BANK | ③CHANGE THE DIRECTION OF AN AUXILIARY BANK |
|---|---|---|---|
| STRUCTURE | 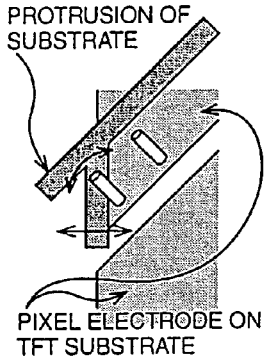 | 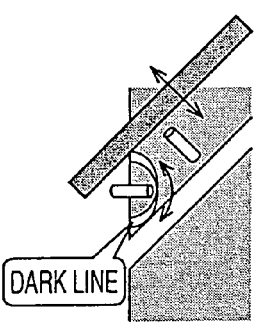 | 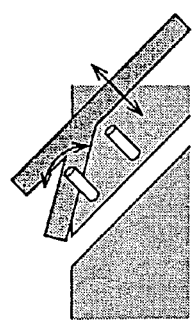 |
| TRANSMITTANCE | 1 | 0.9 | 0.95 |
| MISALIGNMENT MARGIN | × | ○ | △ |
| FEATURES | •LIQUID CRYSTAL ORIENTATION OF A PIXEL EDGE CHANGES GREATLY DUE TO DEVIATION AMONG EACH SHOT AND IN PASTING (A LARGE DEGREE OF TRANSMITTANCE CHANGE) •NO DARK LINE ON A PIXEL EDGE (A LARGE DEGREE OF IMPROVEMENT IN TRANSMITTANCE) | •LIQUID CRYSTAL ORIENTATION OF A PIXEL EDGE CHANGES DUE TO DEVIATION AMONG EACH SHOT AND IN PASTING (TO A SMALL DEGREE) •OCCURRENCE OF ONE DARK LINE ON A PIXEL EDGE (A LARGE DEGREE OF DECREASE IN TRANSMITTANCE) | •LIQUED CRYSTAL ORIENTATION OF A PIXEL EDGE CHANGES DUE TO DEVIATION AMONG EACH SHOT AND IN PASTING •NO DARK LINE ON A PIXEL EDGE |

FIG. 12

| | ④ HOLLOW IN A PIXEL EDGE | ⑤ FINE SLITS +CONNECTION AT THE END |
|---|---|---|
| STRUCTURE | 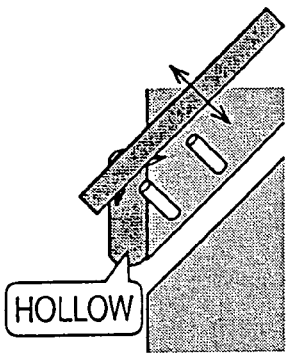 | 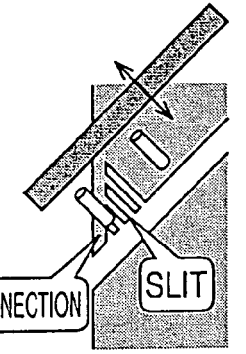 |
| TRANSMITTANCE | 0.92 | 0.95 |
| MISALIGNMENT MARGIN | ○ | ◎ |
| FEATURES | ·LIQUID CRYSTAL ORIENTATION OF A PIXEL EDGE CHANGES DUE TO DEVIATION AMONG EACH SHOT AND IN PASTING (WITH A MARGIN) ·NO DARK LINE ON A PIXEL EDGE | ·LIQUID CRYSTAL ORIENTATION DOES NOT CHANGE EASILY DUE TO DEVIATION AMONG EACH SHOT AND IN PASTING (WITH THE LARGEST MARGIN) ·NO DARK LINE AT A PIXEL EDGE (TRANSMITTANCE UNDER IMPROVEMENT) ·TRANSMITTANCE IS IMPROVED GREATLY AT A DRIVING VOLTAGE OF 6V OR HIGHER (EQUAL TO ①) |

SECTIONAL VIEW

PLANE VIEW $w_1 > w_2$

SECTIONAL VIEW

PLANE VIEW

PLANE VIEW

SECTIONAL VIEW

PLANE VIEW

SECTIONAL VIEW

PLANE VIEW

SECTIONAL VIEW

A REGION WITH NO ELECTRODE ON BOTH OF THE SUBSTRATES

ALIGNMENT DIRECTION OF
THE LIQUID CRYSTAL MOLECULE

PIXEL STRUCTURE OF AN MVA LIQUID CRYSTAL DISPLAY (ONE PIXEL)

PLANE VIEW

SECTIONAL VIEW

ALIGNMENT DIRECTION OF THE LIQUID CRYSTAL MOLECULE

OPTICAL APPEARANCE

WITHOUT AN AUXILIARY BANK

WITH AN AUXILIARY BANK

STRENGTH OF
SINGULAR POINTS OF
ORIENTATION VECTOR
● S=+1
○ S=−1

OBSERVED WITH A TFT
SUBSTRATE ON
A LOWER SIDE AND
A CF SUBSTRATE ON
AN UPPER SIDE

LARGE OVERLAPPING WIDTH OF
AN AUXILIARY PROTRUSION AND
A PIXEL EDGE

SMALL OVERLAPPING WIDTH OF
AN AUXILIARY PROTRUSION AND
A PIXEL EDGE

LIQUID CRYSTAL DEVICE COMPRISING A SECOND ORIENTATION CONTROL ELEMENT CONSTITUTED BY AN ASSEMBLY OF DISTINCT PLURAL ORIENTATION CONTROL ELEMENTS FORMED BETWEEN ADJACENT REPETITIONS OF A FIRST ORIENTATION CONTROL ELEMENT

CROSS-REFERENCE TO RELATED APPLICATIONS

This application is a division of Ser. No. 10/047,216 filed Jan. 14, 2002.

This application is based upon and claims priority of Japanese Patent Application No. 2001-029814, filed on Feb. 6, 2001, the contents being incorporated herein by reference.

BACKGROUND OF THE INVENTION

1. Field of the Invention

The present invention relates to liquid crystal display devices in which a first substrate having a pixel electrode and an active element and a second substrate having an opposed electrode have a liquid crystal layer interposed therebetween with each of the electrodes thereof facing each other and also relates to liquid crystal orientation methods.

2. Description of the Related Art

Conventionally, a liquid crystal display device in a TN mode in which liquid crystal material with a positive dielectric anisotropy is put in a dark state and is oriented to be in a horizontal direction relative to a substrate surface and twisted 90° between opposed substrates is widely used as a liquid crystal display (LCD) using an active matrix.

However, the TN mode has a disadvantage that it is inferior in its viewing angle characteristic and various studies have been made to improve the viewing angle characteristic thereof. As a method substituting for the TN mode, an MVA (Multi-domain Vertical Alignment) system in which liquid crystal material with a negative dielectric anisotropy is vertically oriented and liquid crystal molecules under voltage application are regulated, without giving rubbing treatment to oriented films, to tilt in directions by protrusions and slits which are provided on surfaces of the substrates has been developed. The MVA system has succeeded in improving the viewing angle characteristic to a great extent.

The structure and function of an MVA system liquid crystal display device will be described below.

The MVA system is a system which performs orientation dividing of a vertical orientation type liquid crystal by providing elements in the forms of bank-shaped (linear) protrusions and slits on the substrates. As shown in FIG. 22, FIG. 23A, and FIG. 23B (a sectional view taken along the line I–I'), the elements 103 in the forms of the linear protrusions and slits are arranged alternately on an upper substrate 101 and a lower substrate 102. Thereby, liquid crystal domains in which orientation directions on both sides of the element 103 are approximately 180° different from each other are formed in regions without the element 103 (spaced interval parts). In this way, a suitable orientation dividing is realized. This MVA system has improved the viewing angle characteristic of the liquid crystal display device to a great extent.

Here, the 'linear (bank-shaped) protrusion' is made of dielectric material and formed on an electrode (for example, a pixel electrode, an opposed (a common) electrode, and so on) and the 'slit' is a concave portion formed in a part of the electrode. Hereinafter, the same expressions in the specification of this patent application designate the above elements.

However, the conventional MVA system liquid crystal display device has a disadvantage that light transmittance of a panel is lower than that of a liquid crystal display device in a TN mode. One of the reasons will be described with reference to FIGS. 24 and 25.

FIGS. 24A and 24B show states of pixel observation when a conventional MVA panel used in general is in a white display state. FIGS. 25A and 25B show states of liquid crystal orientation.

As shown in FIG. 24A and FIG. 25B, it is seen that a line which appears dark (a dark line 105) exists in a part of a region near an edge of a pixel electrode 104. In this region, as shown in FIG. 24B (a sectional view taken along the line I–I') and FIG. 25A, the element 103 on the pixel electrode 104 regulates liquid crystal molecules to tilt in a right direction relative to the element 103 while a slanting electric field of the edge of the pixel electrode 104 regulates the liquid crystal molecules to tilt in a left direction. Therefore, liquid crystal orientation directions defined by them are substantially opposite to each other. As a result, the liquid crystal molecules in this region are oriented in the same direction as a polarizing axial direction, which optically causes the dark line to occur and therefore, lowers the transmittance.

As shown in FIG. 26A and FIG. 26B (a sectional view taken along the line I–I'), this problem is solvable by applying a method of newly providing a bank-shaped element 106 (an auxiliary bank method) on an opposed part to the edge of the pixel electrode. The newly provided element 106 is disposed along the edge of the pixel electrode. At this time, the element 106 regulates the liquid crystal molecules to be oriented in an opposite direction to the direction defined by the slanting electric field of the edge of the pixel electrode. Thereby, the liquid crystal orientation near the edge of the pixel electrode is caused to be substantially in the same orientation direction defined by the originally provided element 103.

FIGS. 27A and 27B show the position of the dark line within the pixel at this time.

In FIG. 27A and FIG. 27B, black circles and white circles show singular points of an orientation vector and a line connecting the black circles and the white circles shows the dark line. The dark line which conventionally enters inside the pixel stays on the newly provided element 106. Here, the distribution of the singular points and the dark lines on the whole pixel is shown in FIG. 28.

In this way, the light transmittance of the panel can be improved by approximately 10% compared with that in the conventional art. Here, the newly provided element 106 works in a manner in which it helps the liquid crystal orientation approximate to the original liquid crystal orientation control defined by the originally provided element 103. Therefore, the newly provided element 106 is hereinafter called an auxiliary bank.

However, it is found that a problem of partial unevenness in brightness within the panel, which is recognized as irregular display or ununiformity in display brightness, occurs when this method is applied. After investigation, it is found that this problem is caused by the following reason.

In order to drive the liquid crystal molecules, it is necessary to form a TFT element, bus line, and pixel electrode patterns on one. of the substrates. These patterns are formed by a photolithography process. At present, resist exposure is performed with the surface within the panel being divided into regions (exposure by shots using stepper machines) in order to form fine patterns of approximately several microns at the minimum with the equal shapes and width all over the panel.

At this time, overlapping widths of the substrate and a photomask sometimes deviate a little between adjacent shots from each other. This deviation causes relative position of the edge of the pixel electrode and the auxiliary bank to vary from shot to shot. As described above, the liquid crystal orientation direction defined by the edge of the pixel electrode and the liquid crystal orientation direction defined by the auxiliary bank are opposite to each other. Therefore, when the relative position of the edge of the pixel electrode and the auxiliary bank varies, orientation control balance between them varies, which sometimes influences the liquid crystal orientation near the auxiliary bank. Particularly, when deviation in overlapping width of a TFT substrate and an opposed substrate (having the auxiliary bank) is large, this problem occurs distinctly.

A difference in states of the liquid crystal orientation (the dark line) caused by the variation of the relative position of the auxiliary bank and the edge of the pixel electrode is shown in FIGS. 29A and 29B. When the overlapping width of the auxiliary bank and the edge of the pixel electrode is wide (FIG. 29A), the dark line stays on the auxiliary bank. Meanwhile, when the overlapping width is narrow (FIG. 29B), the dark line gets inside the pixel. As a result, a difference in transmittance between both of the pixels is caused. In this way, brightness among each shot is caused to be different from each other, which is recognized as irregular display or ununiformity in display brightness.

As a countermeasure for improving this problem, it can be thought of that the auxiliary bank is disposed further inside the edge of the pixel electrode than in the conventional art so that the effect of the auxiliary bank does not vary even with some degree of overlapping deviation. However, in this case, it is found that a dark region newly occurs as shown in FIG. 30 and the light transmittance of the panel is lowered.

So far, since the auxiliary bank and the bank on the pixel electrode are formed under the same condition, they also give the same influence to the orientation of the liquid crystal molecules. The bank on the pixel electrode regulates the liquid crystal molecules in the bank spaced interval part to tilt in a perpendicular direction relative to an extending direction of the bank. Here, when the auxiliary bank gets sufficiently inside the pixel electrode, the liquid crystal molecules in its vicinity also tilt in a perpendicular direction relative to an extending direction of the bank (halftone dot meshing parts in FIG. 28). Since this direction is substantially equal to the polarizing axial direction of a polarizing plate, the light transmittance of the panel is lowered.

Furthermore, it is proposed that the auxiliary bank is made lower in height than the bank on the pixel electrode. However, this necessitates banks different in height to be formed on the same substrate and consequently a process becomes complicated.

From FIGS. 26A and 26B, and FIG. 28, it is apparent that ideally, the liquid crystal orientation near the auxiliary bank is in a direction of 45° relative to the auxiliary bank and in the perpendicular direction relative to the bank on the pixel electrode and the dark line stays on the auxiliary bank and does not get inside the pixel electrode. However, in the present structure, the various problems as described above occur and it is very difficult to stably realize the ideal orientation state.

As described above, when the MVA system is applied, the viewing angle characteristic is greatly improved. On the contrary, the slanting electric field which occurs near the edge of the pixel electrode has a big influence and promotes a so-called dark lines or a part of schlieren pattern to be formed. Even when the auxiliary bank is provided in order to cope with this problem, the influence by the deviation in mask overlapping at the time of patterning sometimes arises, and therefore, it is difficult to obtain an even liquid crystal orientation state.

SUMMARY OF THE INVENTION

It is an object of the present invention to prevent an occurrence of irregular display or ununiformity in display brightness and greatly improve light transmittance of a panel and thereby realize a liquid crystal display device with high reliability by suppressing orientation abnormality within a pixel region for display which is caused by a slanting electric field occurring inside the pixel region for display and in its vicinity and controlling liquid crystal orientation in a stable and ideal state.

The present invention relates to a liquid crystal display device in which a first substrate having a pixel electrode and an active element and a second substrate having an opposed electrode, which have a liquid crystal layer interposed therebetween with each of the electrodes thereof facing each other.

A liquid crystal display device according to the first aspect of the present invention is characterized in that when a direction of an orientation regulating force given to liquid crystal molecules of the liquid crystal layer within a region of the pixel electrode is taken as a first direction and a direction of an orientation regulating force due to an edge of the pixel electrode on the first substrate given to the liquid crystal molecules near the edge is taken as a second direction, an orientation control element giving an orientation regulating force in a third direction which counteracts the orientation regulation force in the second direction is locally provided in a part near the edge.

A liquid crystal display device according to the second aspect of the present invention is characterized in that an orientation control element giving an orientation regulating force to the liquid crystal molecules near the edge of the pixel electrode on the first substrate is locally provided near the edge of the pixel electrode on the first substrate so that the liquid. crystal molecules including those near the edge are oriented in substantially the same direction when voltage is being applied between the pixel electrode and the opposed electrode.

Specifically, in the first and second aspects, it is appropriate that the orientation control element is constituted by a plurality of fine slits formed in the pixel electrode in an oblique direction relative to an extending direction of the edge.

It is also appropriate that the orientation control element is constituted by a plurality of fine protrusions formed on the pixel electrode in the oblique direction relative to the extending direction of the edge.

In this case, at least a part of the fine slits or the fine protrusions are preferably formed to have different shapes and/or spaced intervals and/or length of arrangement from others.

In the first and second aspects, each of the corresponding orientation control elements is formed near the edge of the pixel electrode on the first substrate on which the pixel electrode is also formed. This makes it possible to almost completely eliminate an adverse effect of deviation in pasting width of the two substrates and greatly widen a manufacturing margin and sufficiently cope with an abrupt disorder of manufacturing apparatuses.

A liquid crystal display device according to the third aspect of the present invention is characterized in that a first orientation control element extending in a nonparallel direction relative to the extending direction of the edge of the pixel electrode and a second orientation control element extending in a parallel direction relative to the extending direction of the edge are provided on at least one of the first substrate and the second substrate, and the first orientation control element has a wider width than the second orientation control element.

A liquid crystal display device according to the fourth aspect of the present invention is characterized in that a first orientation control element extending in the non-perpendicular direction and the nonparallel direction relative to the extending direction of the edge of the pixel electrode and a second orientation control element extending in the parallel direction relative to the extending direction of the edge are provided on at least one of the first substrate and the second substrate, and the liquid crystal molecules of the liquid crystal layer on the second orientation control element are oriented in a non-vertical direction relative to the substrate when no voltage is being applied between the pixel electrode and the opposed electrode.

A liquid crystal display device according to the fifth aspect of the present invention is characterized in that a first orientation control element extending in the non-perpendicular direction and the nonparallel direction relative to the extending direction of the edge of the pixel electrode and a second orientation control element extending in the parallel direction relative to the extending direction of the edge are provided on at least one of the first substrate and the second substrate, and at least a part of the liquid crystal molecules of the liquid crystal layer on the. second orientation control element are oriented in a vertical direction relative to the substrate when voltage is being applied between the pixel electrode and the opposed electrode.

A liquid crystal display device according to the sixth aspect of the present invention is characterized in that a first orientation control element extending in the non-perpendicular direction and the nonparallel direction relative to the extending direction of the edge of the pixel electrode and a second orientation control element extending in the parallel direction relative to the extending direction of the edge are provided on at least one of the first substrate and the second substrate, and the second orientation control element is composed of an assembly of shapes having directivity in a direction of a substrate's plane surface.

Specifically, in the third to the sixth aspects, it is appropriate that the first orientation control element and/or the second orientation control element is constituted by slits or protrusions formed on the pixel electrode or the opposed electrode.

In the third aspect, the first orientation control element is wider in width than the second orientation control element so that the strength of orientation control defined by the second orientation control element becomes weaker than an orientation control force defined by the first orientation control element on the pixel electrode. This makes it possible to stably realize an ideal state in which the liquid crystal molecules are oriented in a direction of approximately 45° relative to the second orientation control element and in a perpendicular direction relative to the first orientation control element on the pixel electrode.

In the fourth aspect, when no voltage is being applied, the liquid crystal molecules on the second orientation control element is non-vertically oriented and is oriented in the same direction as the orientation direction of the liquid crystal molecules which causes a dark line to occur under voltage application, that is, a parallel direction to an extending direction of the second orientation control element. Consequently, when voltage is being applied, the dark line occurs stably only on the second orientation control element, the orientation on which is made to be non-vertical in advance.

In the fifth aspect, the liquid crystal molecules on the second orientation control element are in vertical orientation under voltage application. One of the causes for strengthening the slanting (oblique) electric field of the pixel electrode, which is one of the factors causing unevenness among each shot at the time of patterning, is an influence of an electric field of an adjacent bus line. In this aspect, a region in which the liquid crystal orientation does not change (remains in the vertical orientation) is provided between the bus line and the pixel electrode. This makes it possible to eliminate the influence given to the liquid crystal orientation on the pixel electrode by the bus line. Therefore, the slanting electric field of the edge of the pixel electrode can be weakened and the unevenness among each shot is prevented from occurring.

In the sixth aspect, the structure having directivity is provided as the second orientation control element. The directivity is in the same direction as the orientation direction of the liquid crystal molecules which causes the dark line to occur under voltage application, that is, a parallel direction to the extending direction of the second orientation control element. Thereby, the dark line occurs stably only on the second orientation control element having the directivity under voltage application. This makes it possible to eliminate the adverse effect caused by the occurrence of the dark line at the inside but only at the edge and realize an actually high light transmittance of the panel.

The present invention also relates to a liquid crystal orientation method of a liquid crystal layer in the liquid crystal display device. According to the method, the liquid crystal molecules are oriented in accordance with the first to the sixth aspects.

BRIEF DESCRIPTION OF THE DRAWINGS

FIGS. 3A to 3C show states when orientation regulating forces are given to liquid crystal molecules in first to third directions;

FIG. 11 shows various effects and features in the first and second embodiments and comparative examples thereof;

FIG. 12 shows various effects and features in the first and second embodiments and comparative examples thereof;

DETAILED DESCRIPTION OF THE PREFERRED EMBODIMENTS

Hereinafter, preferred embodiments of the present invention will be described in detail with reference to drawings.

First Embodiment

Figure 1:
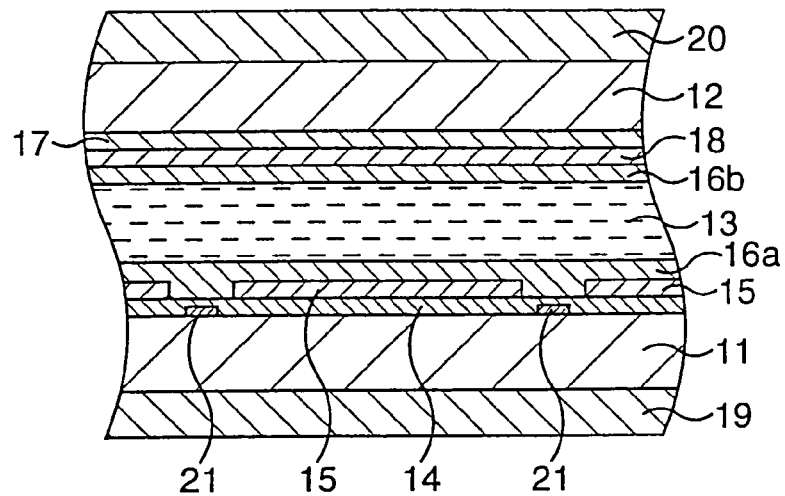
FIG. 1 is a sectional view schematically showing the structure of a liquid crystal display device according to the present invention.

FIG. 1 is a schematic sectional view showing a main structure of a liquid crystal display device according to the first embodiment of the present invention.

The liquid crystal display device, which is based on a so-called MVA system, is composed of a pair of transparent glass substrates 11, 12 facing each other with a predetermined spaced interval being provided therebetween and a liquid crystal layer 13 interposed between the transparent glass substrates 11, 12.

On one of the transparent glass substrates 11, pixel electrodes 15 and not-shown thin film transistors (TFT), which are formed by a thin film semiconductor technique using a thin semiconductor film such as an amorphous silicon film or a polycrystalline silicon film and work as active elements, are formed with an insulating layer 14 being provided between them and the substrate 11. A transparent oriented film 16a is formed to cover the pixel electrodes 15. On the other transparent glass substrate 12, a color filter 17, a common electrode (an opposed electrode) 18, and an oriented film 16b are laminated in sequence generally. The glass substrates 11, 12 are fixed in a manner in which the oriented films 16a, 16b are pressed against each other to hold the liquid crystal layer 13 therebetween. Outside the substrates 11, 12, polarizers 19, 20 are provided respectively. The pixel electrodes 15 are formed with active matrixes (TFT matrixes) and, in the example in FIG. 1, data bus lines 21 to which drain electrodes of the TFTs are connected are shown. Moreover, gate bus lines, though not shown, to which gate electrodes of the TFTs are connected are also formed.

Figure 2A:
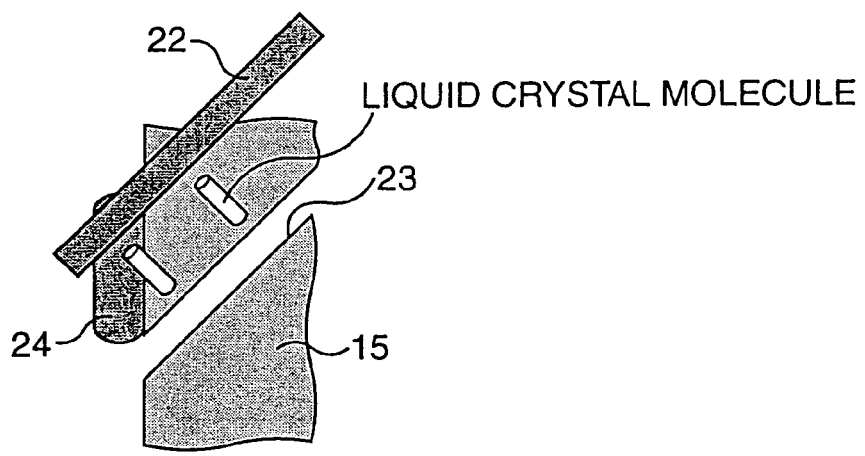
FIGS. 2A to 2C show states near a pixel of a liquid crystal display device according to the first embodiment of the present invention.

As shown in FIG. 2A, on a surface of the transparent glass substrate 12 as a CF substrate, a bank-shaped pattern 22, which is an orientation control element extending in an oblique direction relative to an edge of the pixel electrode 15 on the opposed transparent glass substrate 11, is formed on the common electrode (under the oriented film). Thereby, predetermined division, for example, four divided orientation, is performed to each pixel of the liquid crystal layer 13.

Figure 2B:
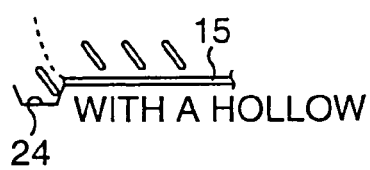

Meanwhile, as shown in FIG. 2A and FIG. 2B, on a surface of the transparent glass substrate 11 as a TFT substrate, a slit pattern 23, which is an orientation control element extending in the oblique direction in this case relative to the edge of the pixel electrode 15, is formed in the pixel electrode 15 to extend in a substantially parallel direction to an extending direction of the bank-shaped pattern 22. Furthermore, a hollow 24 is locally formed as an orientation control element in a part other than the pixel electrode 15 in the vicinity of the edge of the pixel electrode 15.

When an auxiliary bank is formed on the CF substrate as in a conventional art, a margin for pasting the substrates is only approximately ±3 µm. This gives only a minimum margin even when a pasting apparatus for substrates with high precision is utilized and enables manufacturing only when perfect control of process conditions is realized. Therefore, there is always a risk that a large amount of unevenness among each shot may occur to a panel even when a manufacturing apparatus gets into a bad condition only a little. This problem is basically caused because the auxiliary bank for controlling the orientation of a pixel electrode edge portion is not provided on a pixel electrode side but on an opposed substrate side. According to this embodiment, the hollow 24 as the orientation control element of the edge of the pixel electrode 15 is provided in the transparent glass substrate 11 on which the pixel electrode 15 is formed so that almost no influence is given by deviation in pasting.

Therefore, according to this embodiment, it is possible to provide a liquid crystal display device which is capable of realizing high contrast by utilizing the MVA system, securing high reliability by realizing an excellent viewing characteristic, and achieving more uniform distribution of brightness. At the same time, a liquid crystal display device is provided which is capable of greatly widening a manufacturing margin and sufficiently coping with an abrupt disorder of the manufacturing apparatus.

As described above, to form the hollow 24 as the orientation control element of the edge on the surface of the transparent glass substrate 11 on which the pixel electrode 15 is formed means, in other words, to provide in a part of a pixel region for display near the edge an orientation control factor which gives an orientation disturbing force in a third direction different from a first direction of a liquid crystal orientation regulating force given by the bank-shaped pattern 22 and the slit pattern 23 within the pixel region for display and a second direction of a liquid crystal orientation regulating force given by a slanting electric field occurring near the edge of the pixel electrode. As a result, the manufacturing margin is increased.

Figure 3A:
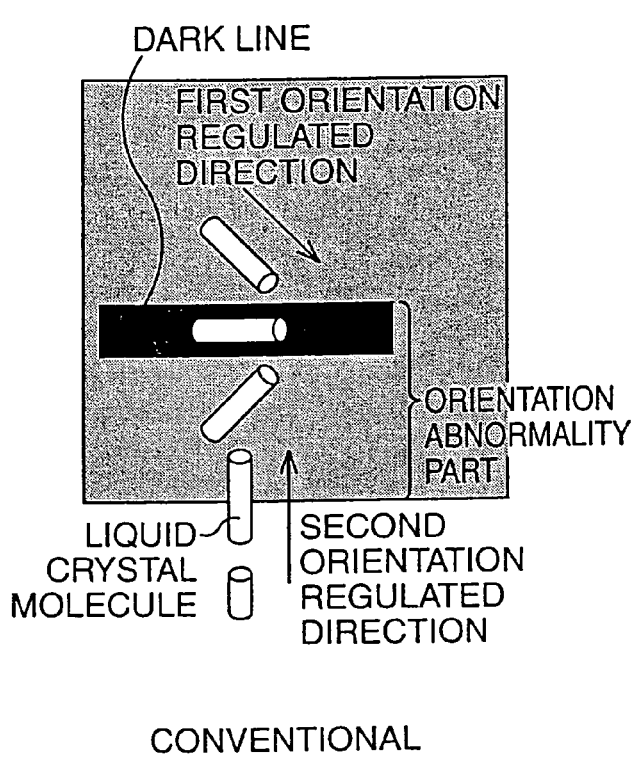
Figure 3C:
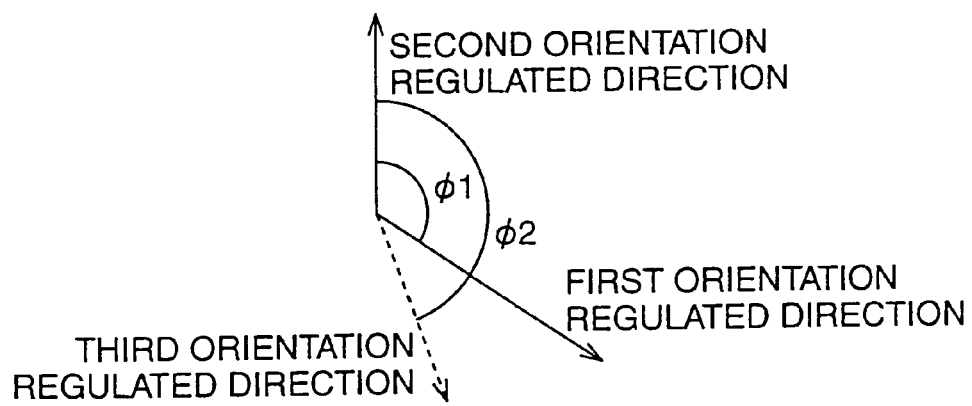

A principle of providing the orientation control factor is shown in FIGS. 3A to 3C in general.

Conventionally, a dark line occurs due to orientation abnormality near the edge of the pixel electrode (FIG. 3A). But, in contrast, the influence of the orientation abnormality due to the slanting electric field is eliminated by giving to liquid crystal molecules the orientation regulating force in the third direction (FIG. 3B) which makes a bigger angle $\phi 2$ with the second direction than an angle $\phi 1$ made by the first and second directions (FIG. 3C). The angle $\phi 1$ and the angle $\phi 2$ can be equal.

[Specific Example of Structure]

Figure 2C:
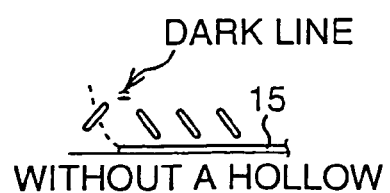

As shown in FIGS. 2A to 2C, the hollow 24 is formed in a part near the edge of the pixel electrode (corresponding to a part-where the conventional auxiliary bank is formed). The hollow 24 is formed to be approximately 0.5 μm in depth by patterning a SiN insulating film on the side of the transparent glass substrate 11 as the TFT substrate. The liquid crystal molecules at the edge of the pixel electrode have a pretilt angle in an opposite direction to the direction of the electric field, being influenced by the hollow 24. This prevents the dark line from occurring as in a conventional case in which the auxiliary bank is provided.

As explained above, according to this embodiment, the orientation abnormality within the pixel region for display caused by the slanting electric field which occurs near the pixel edge and in its vicinity is suppressed and the liquid crystal orientation is controlled to be in a stable and ideal state. Thereby, irregular display or ununiformity in display brightness is prevented from occurring and the light transmittance of the panel is greatly improved. This makes it possible to realize a liquid crystal display device with high reliability.

Incidentally, instead of the orientation control element, or preferably, in addition to the orientation control element, a Cs electrode may be provided along the edge of the pixel electrode. The Cs electrode has the same electric potential as that of the opposed substrate side so that liquid crystal molecules in the part where the Cs electrode is provided do not tilt. Therefore, providing the Cs electrode makes it possible to shield the influence of the electric field from the bus line (electric field intensity does not easily fluctuate near the edge of the pixel electrode) so that stable orientation can be constantly obtained.

Second Embodiment

The second embodiment of the present invention will be described below. Here, a liquid crystal display device based on the MVA system will be described like in the first embodiment. But the orientation control element formed near the pixel electrode 15 on the TFT substrate side has a different form.

Like in the first embodiment schematically shown in FIG. 1, this liquid crystal display device is composed of a pair of transparent glass substrates 11, 12 facing each other with a predetermined spaced interval being provided therebetween and the liquid crystal layer 13 interposed between the transparent glass substrates 11, 12. On the transparent glass substrate 11, the pixel electrodes 15, data bus lines 21, a gate bus line (not shown), and so on are formed. On the transparent glass substrate 12, the color filter 17, the common electrode 18, and so on are formed.

Figure 4:
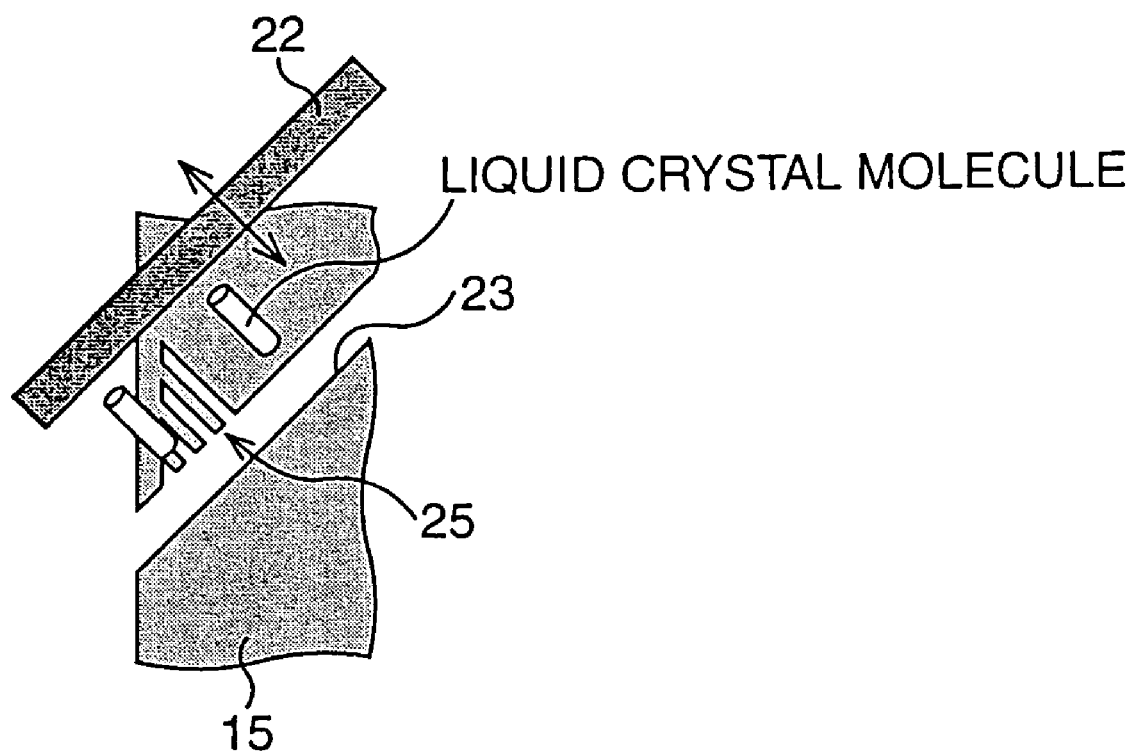
FIG. 4 is a plane view showing a state near a pixel of a liquid crystal display device according to the second embodiment of the present invention.

In the liquid crystal display device, as shown in FIG. 4, the bank-shaped pattern 22, which is the orientation control element extending in an oblique direction relative to the edge of the pixel electrode 15 on the opposed transparent glass substrate 11, is formed on the surface of the transparent glass substrate 12 as the CF substrate. Thereby, predetermined division, for example, the four divided orientation, is performed on each pixel of the liquid crystal layer 13.

Meanwhile, on the surface of the transparent glass substrate 11 as the TFT substrate, the slit pattern 23, which is the orientation control element extending in the oblique direction relative to the edge of the pixel electrode 15, is formed on the pixel electrode 15 to extend substantially in parallel to an extending direction of the bank-shaped pattern 22. Furthermore, near the edge of the pixel electrode 15, fine slit patterns 25 (concave portions in the pixel electrode 15) are formed locally in an oblique direction relative to the extending direction of the edge (for example, 45°) to constitute an orientation control element.

According to this embodiment, forming in the pixel electrode 15 the fine slit patterns 25 as the orientation control element of the edge of the pixel electrode 15 makes it possible to eliminate almost all the influences by deviation in pasting.

Therefore, according to this embodiment, it is possible to provide a liquid crystal display device which is capable of realizing high contrast by utilizing the MVA system and securing high reliability by realizing an excellent viewing characteristic. At the same time, a liquid crystal display device is provided which is capable of widening the manufacturing margin to a great extent and sufficiently coping with the abrupt disorder of the manufacturing apparatus.

Figure 5:
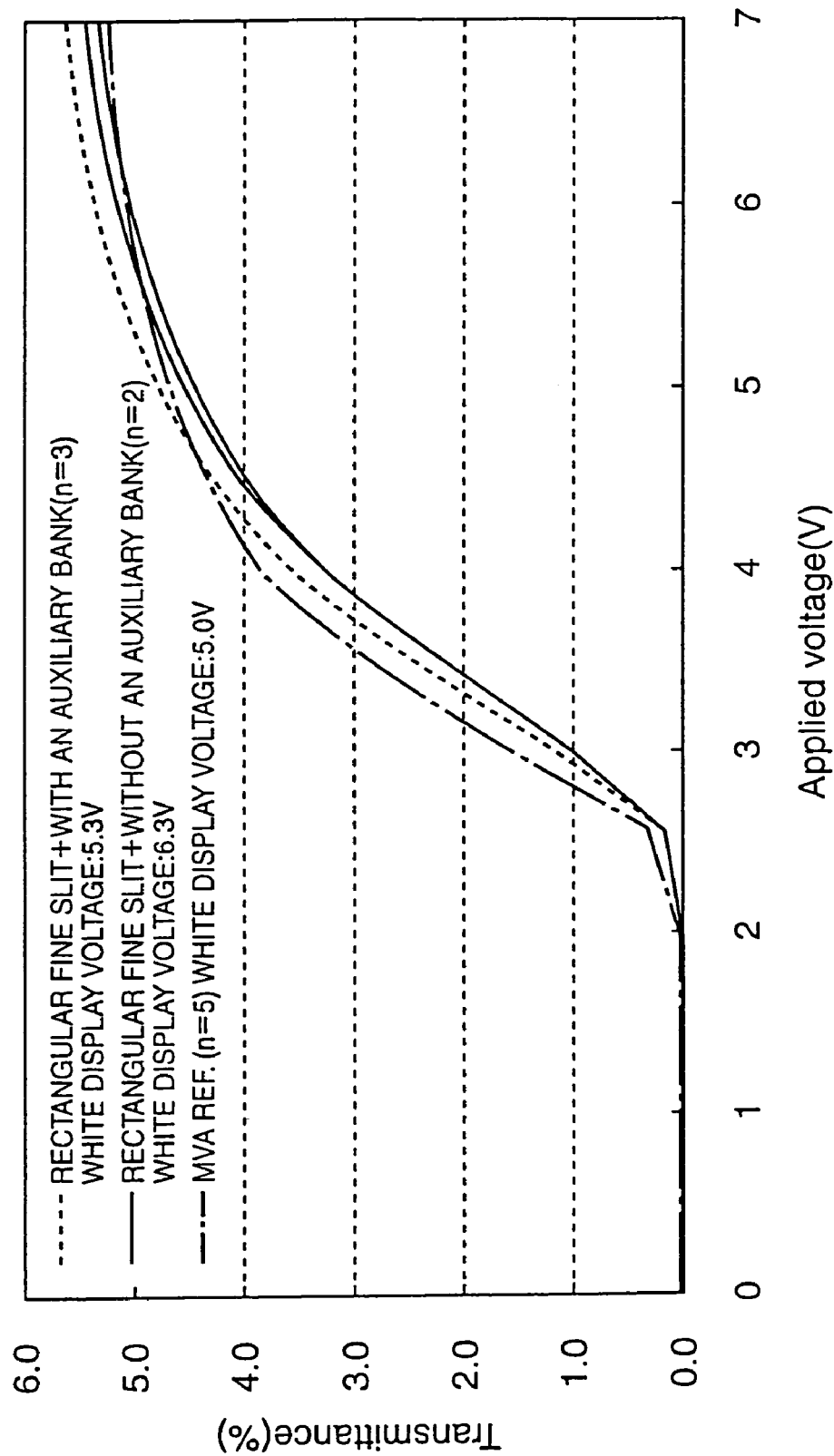
FIG. 5 is a. graph showing a transmittance-voltage (T-V) characteristic of the liquid crystal display device according to the second embodiment.
Figure 6A:
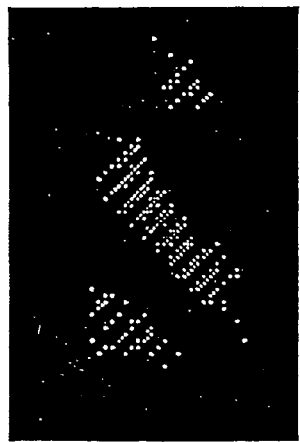
FIGS. 6A to 6F are micrographs showing liquid crystal orientation states.
Figure 6B:
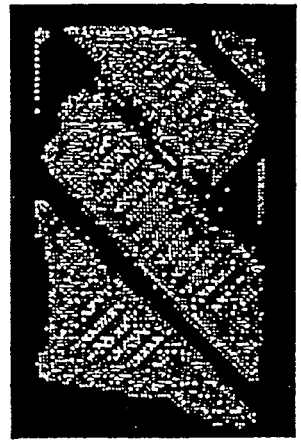
Figure 6C:
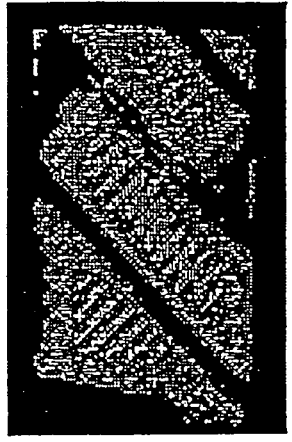
Figure 6D:
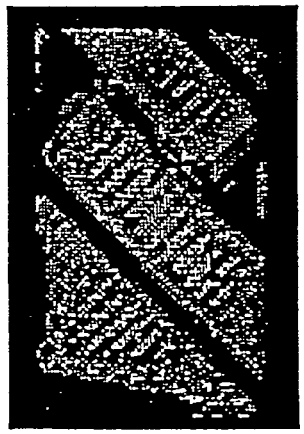
Figure 6E:
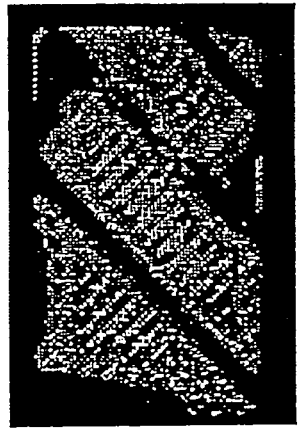
Figure 6F:

A transmittance-voltage characteristic (a T-V characteristic) when this embodiment is actually applied is shown in FIG. 5.*and* FIGS. 6A to 6F. It is apparent that the orientation near the edge of the pixel electrode is made in good order by the fine slit patterns 25 without the conventional auxiliary bank being provided. With sufficient voltage being applied, the effect of the fine slit patterns 25 fully works to improve the transmittance to the same level as that when the auxiliary bank is provided.

[Specific Example of Structure]

As shown in FIG. 4, cuts of the fine slit patterns 25 are formed in the pixel electrode 15 near the edge of the pixel electrode. It has been found that forming the fine slit patterns 25 causes the liquid crystal molecules to tilt in a parallel direction to an extending direction of the fine slit patterns 25 under voltage application. This effect is utilized near the edge. It is apparent from FIGS. 6A to 6F that the disorder of the liquid crystal orientation is suppressed near the edge.

Figure 7:
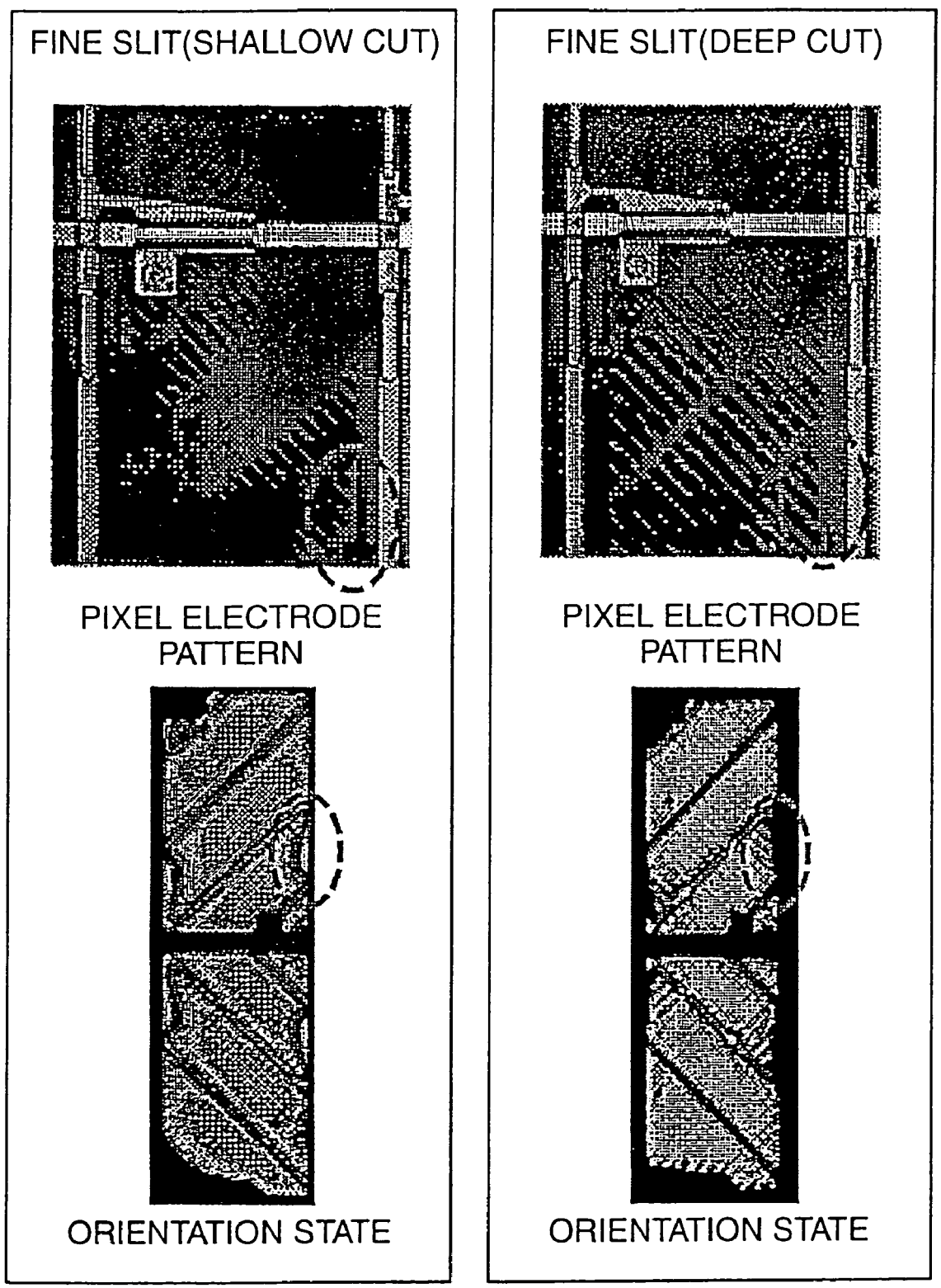
FIG. 7 shows micrographs of liquid crystal orientation states.

FIG. 7 shows a difference in states of the orientation depending on the depth of the cuts of the fine slit patterns 25. In utilizing the fine slit patterns 25, more effect is obtained when the slit depth of the patterns is made sufficiently long.

Moreover, according to this embodiment, since the liquid crystal orientation near the edge is made in good order by cleverly planning distribution of the electric field, not much effect is obtained at low voltage but as the higher voltage is applied, the more effect is obtained. As shown in FIG. 5, display chromaticity of a panel with the auxiliary bank becomes white at applied voltage of 5.3V while that of a panel without the auxiliary bank becomes white at applied voltage of 6.3V. With sufficient voltage being applied, the transmittance equal to or higher than that when the auxiliary bank is utilized is obtained. In this embodiment, the fine slit patterns 25 are also formed by patterning a part of the pixel electrode 15 so that no influence by the deviation in pasting of the two substrates is given to the relative position between the pixel electrode and the edge and therefore, great increase in a pasting margin is realized.

As explained above, according to this embodiment, the orientation abnormality within the pixel region for display, which is caused by the slanting electric field occurring outside the pixel region for display and in its vicinity, is further suppressed and the liquid crystal orientation is controlled to be in a stable and ideal state. As a result, irregular display or ununiformity in display brightness is prevented from occurring and the light transmittance of the panel and brightness uniformity are greatly enhanced. This makes it possible to realize a liquid crystal display device with high reliability.

Modifications

Modifications of the second embodiment will be described below.

In the modifications, at least a part of the fine slit patterns 25 in the liquid crystal display device according to the second embodiment are formed to have different shapes and/or be arranged at different spaced intervals. Modifications 1 to 3 will be described below in order as specific examples.

(Modification 1)

Figure 8:
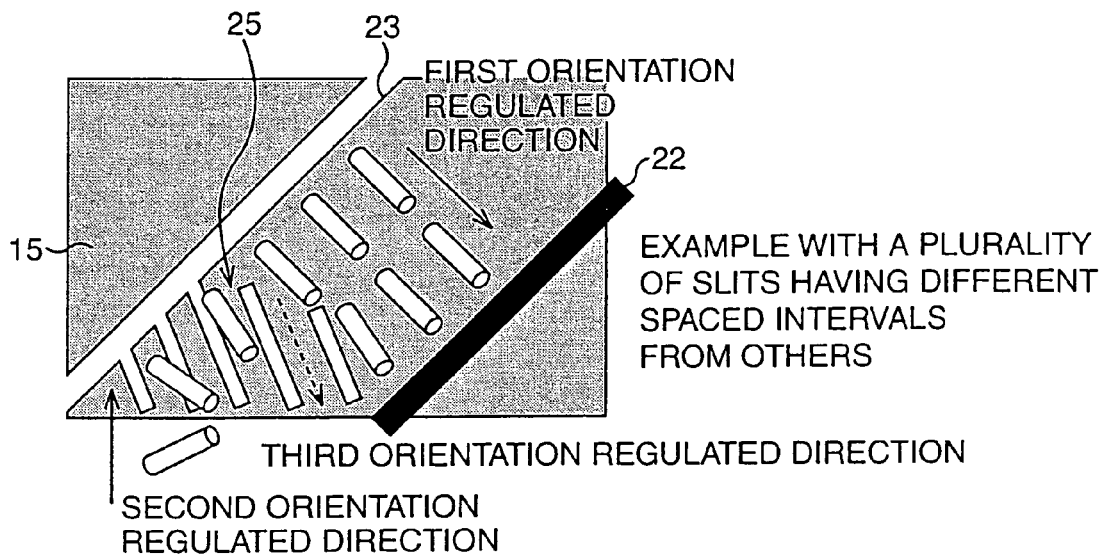
FIG. 8 is a plane view showing a state near a pixel in modification 1 of the liquid crystal display device according to the second embodiment.

Here, as shown in FIG. 8, each of the fine slit patterns 25 is different in length from each other and the orientation regulating force in the third direction is adjusted freely. Incidentally, each of the fine slit patterns 25 is also different in length in the example shown in FIG. 4. In this case, however, they are formed to match the form of the pixel electrode 15 near the edge. Meanwhile, in this example, the length of each of the slit patterns 25 is defined independently from the shape of the pixel electrode 15 near the edge.

(Modification 2)

Figure 9:
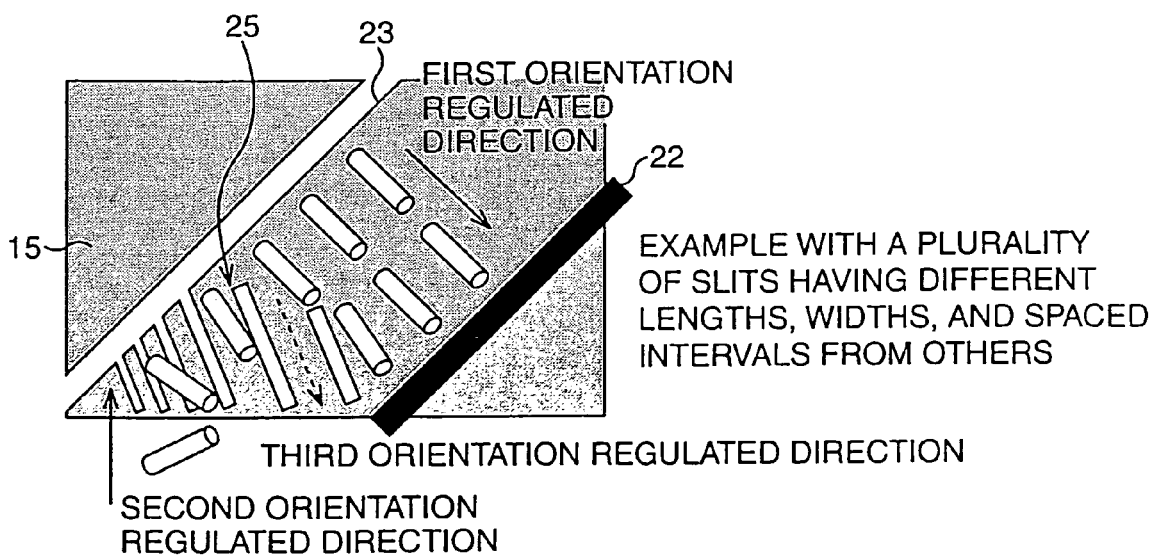
FIG. 9 is a plane view showing a state near a pixel in modification 2 of the liquid crystal display device according to the second embodiment.

Here, as shown in FIG. 9, each of the fine slit patterns 25 is different from each other in length, width, and a spaced interval between adjacent fine slit patterns 25. Consequently, the orientation regulating force in the third direction can be adjusted more delicately at a desired strength.

(Modification 3)

Figure 10:
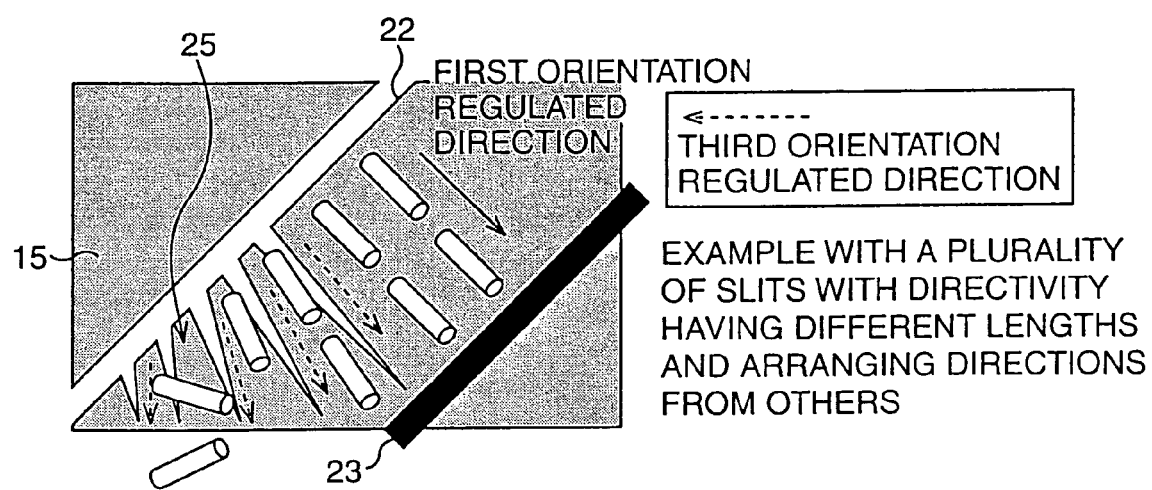
FIG. 10 is a plane view showing a state near a pixel in modification 3 of the liquid crystal display device according to the second embodiment.

Here, as shown in FIG. 10, each of the fine slit patterns 25 has a tapered shape to have directivity. This makes it possible to strongly determine a tilting direction defined by the orientation regulating force in the third direction.

The first and second embodiments have been described above. Various effects and features of the examples and comparative examples of structure are summarized in FIG. 11 and FIG. 12.

Note that ① shows the conventional structure with the auxiliary bank being provided on the CF substrate, ② the conventional structure without the auxiliary bank, ③ the structure with the auxiliary bank being provided to extend in a different direction, ④ the structure with the hollow 24 in the first embodiment being provided, and ⑤ the structure with the fine slit-patterns 25 in the second embodiment being provided, respectively.

As is apparent from the drawings, the liquid crystal display devices having the structures in the first and second embodiments are capable of realizing high transmittance and securing a misalignment margin without sacrificing the transmittance, which is not realized in the comparative examples. Particularly, the structure in the second embodiment shows the most distinguished effect.

Third Embodiment

The third embodiment of the present invention will be described below. Here, a liquid crystal display device based on the MVA system like in the second embodiment will be described. But, an orientation control element provided near the edge of the pixel electrode is different from that in the second embodiment.

Figure 13:
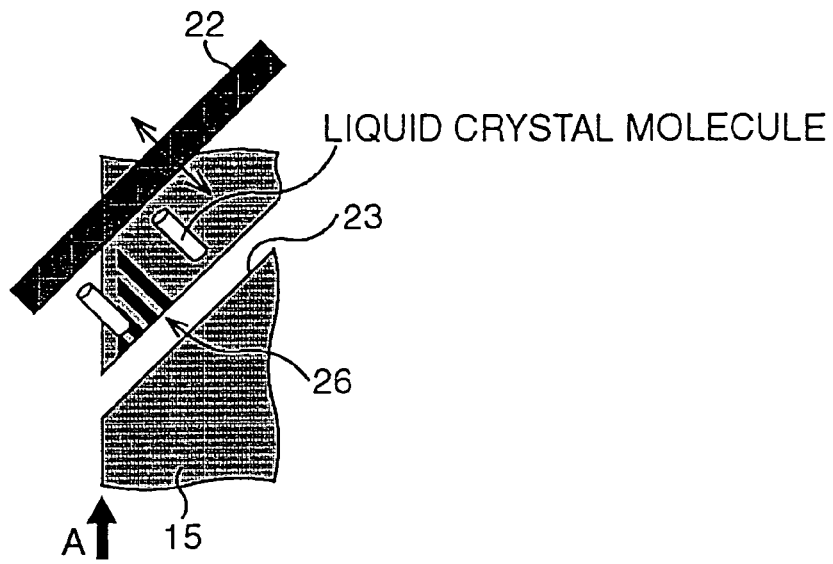
FIG. 13 is a plane view showing a state near a pixel of a liquid crystal display device according to the third embodiment of the present invention.

In the liquid crystal display device according to this embodiment, as shown in FIG. 13, on the surface of the transparent glass substrate 11 as the TFT substrate, the slit pattern 23, which is the orientation control element extending in the oblique direction relative to the edge of the pixel electrode 15 (indicated by the arrow A), is formed in the pixel electrode 15 to extend substantially in parallel to the extending direction of the bank-shaped pattern 22 on the transparent glass substrate 12. Furthermore, near the edge of the pixel electrode 15, fine linear protrusion patterns 26 are formed locally as an orientation control element in the oblique direction relative to the extending direction of the edge (for example, 45°).

According to this embodiment, forming the fine protrusion patterns 26, which constitute an orientation control element of the edge of the pixel electrode 15, on the pixel electrode 15 makes it possible to eliminate almost all the influence of the deviation in pasting.

Therefore, according to this embodiment, it is possible to provide a liquid crystal display device which is capable of realizing high contrast by utilizing the MVA system and securing high reliability by realizing an excellent viewing characteristic. At the same time, a liquid crystal display device is provided which is capable of widening a manufacturing margin to a greater extent than in the first embodiment and sufficiently coping with an abrupt disorder of the manufacturing apparatus.

Incidentally, it is also appropriate in this embodiment like in the modification examples of the second embodiment that each of the fine protrusion patterns 26 is made different in length, width, and spaced intervals from adjacent fine protrusion patterns 26 so that the orientation regulating force in the third direction is adjusted delicately at a desired strength.

Fourth Embodiment

The fourth embodiment of the present invention will be described below. Here, a liquid crystal display device based on the MVA system like in the first embodiment will be described. But, an orientation control element provided near the edge of the pixel electrode is different.

Like in the first embodiment schematically shown in FIG. 1, this liquid crystal display device is composed of a pair of transparent glass substrates 11, 12 facing each other with a predetermined spaced interval being provided therebetween and the liquid crystal layer 13 interposed between the transparent glass substrates 11, 12. On the transparent glass substrate 11, the pixel electrodes 15, the data bus lines 21, the gate bus line (not shown), and so on are formed. On the transparent glass substrate 12, the color filter 17, the common electrode 18, and so on are formed.

Figure 14A:
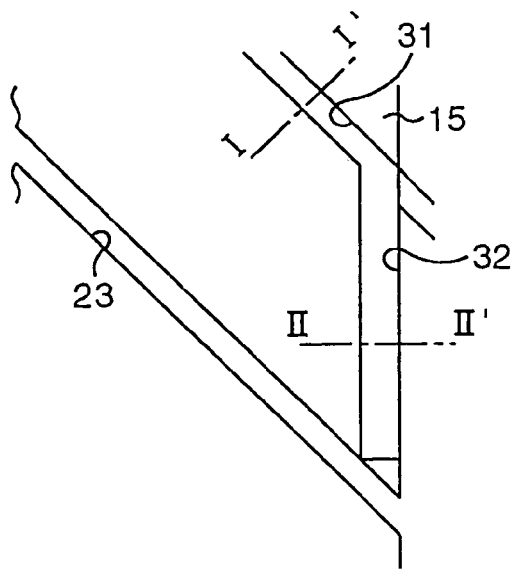
FIGS. 14A and 14B are schematic views showing states near a pixel in a liquid crystal display device according to the fourth embodiment of the present invention.

In the liquid crystal display device, as shown in FIG. 14A, on the surface of the transparent glass substrate 11 as the TFT substrate, the slit pattern 23, which is the orientation control element extending in the oblique direction relative to the edge of the pixel electrode 15, is formed in the pixel electrode 15.

Figure 22:
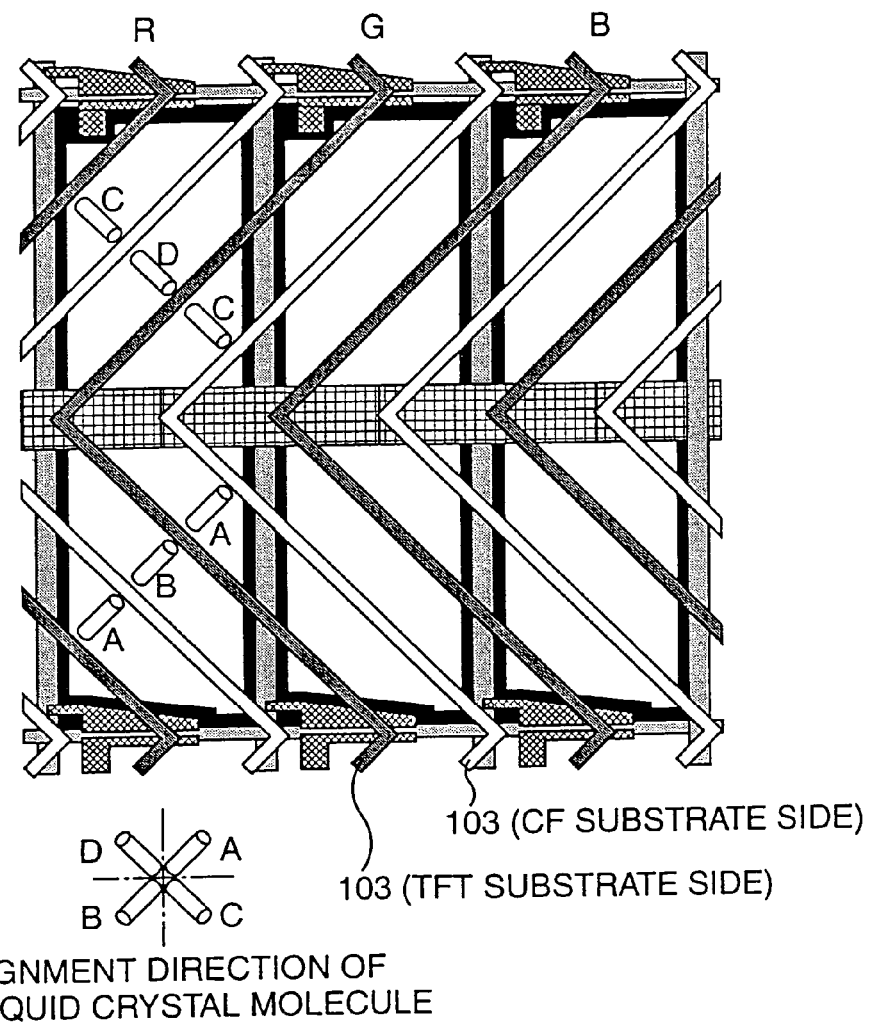
FIG. 22 is a plane view showing a state near a pixel in a conventional liquid crystal display device according to an MVA system.
Figure 23A:
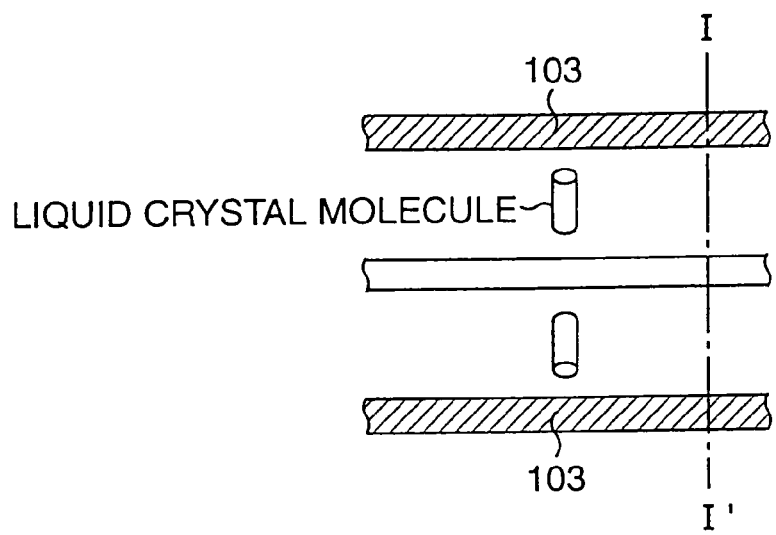
FIGS. 23A and 23B are sectional views showing states when a bank-shaped pattern is provided in a conventional liquid crystal display device.
Figure 23B:
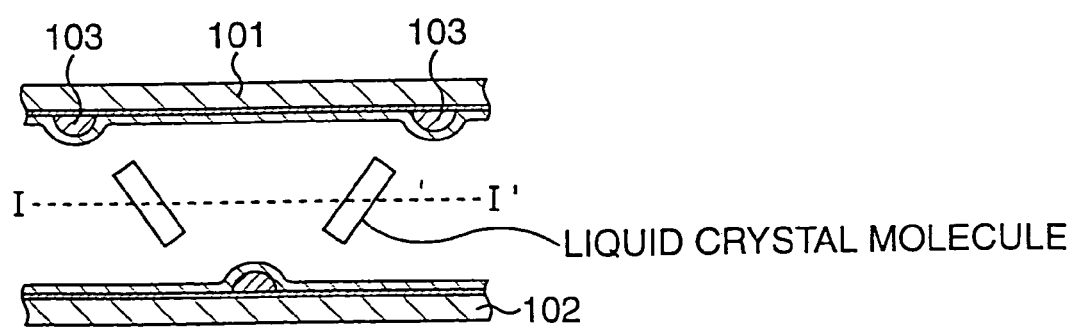
Figure 24A:
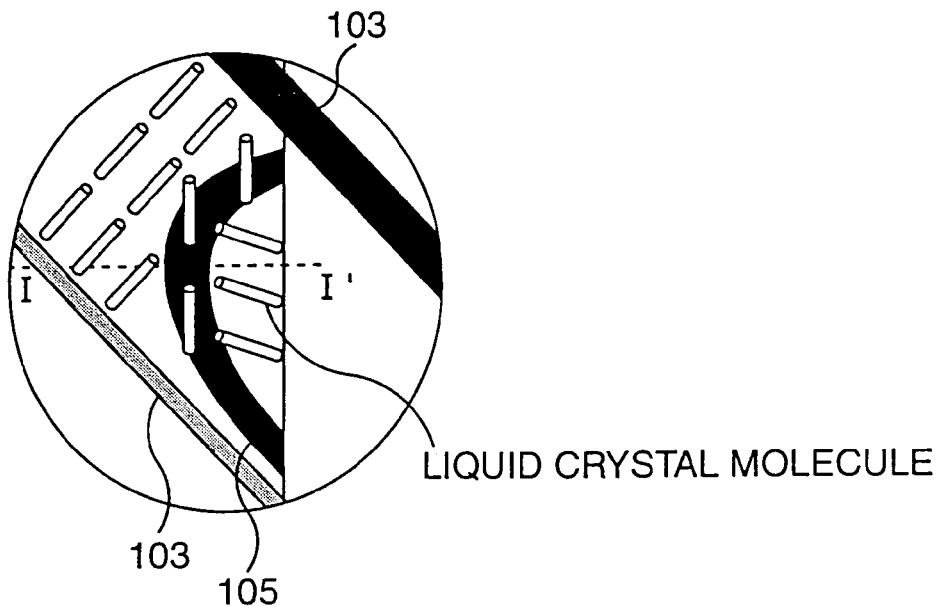
FIGS. 24A and 24B show states when the bank-shaped pattern is provided in the conventional liquid crystal display device.
Figure 24B:
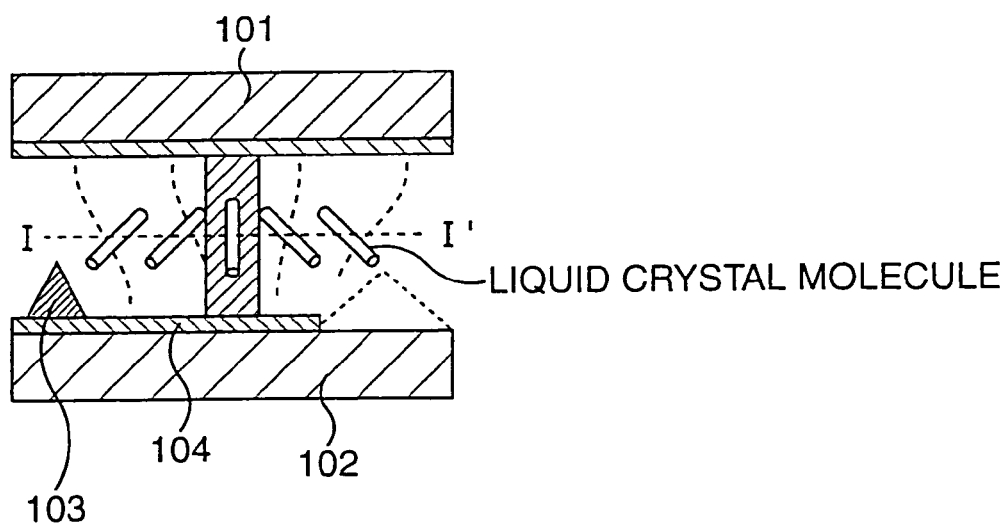
Figure 25A:
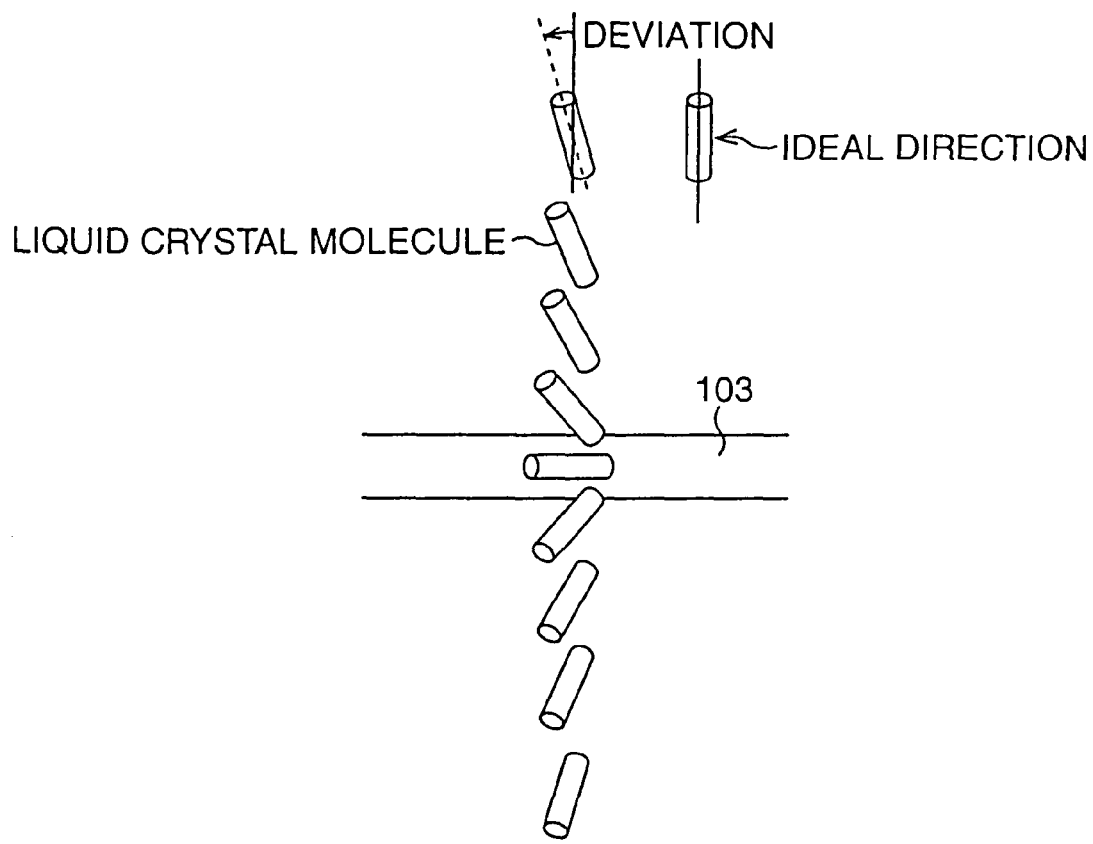
FIGS. 25A and 25B are schematic views showing liquid crystal orientation.
Figure 25B:
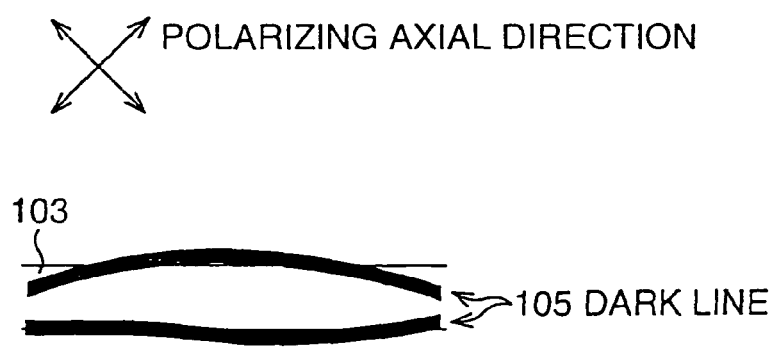
Figure 26A:
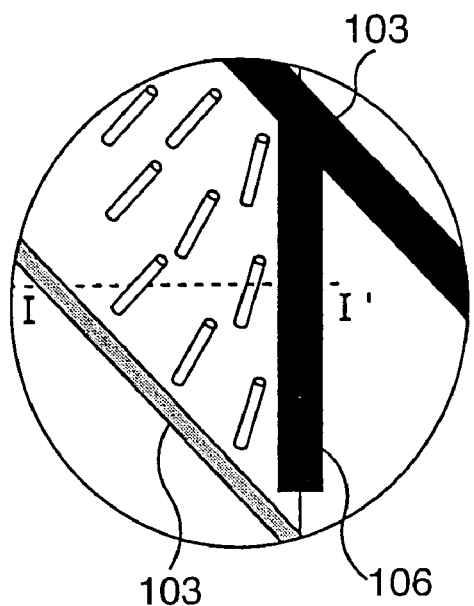
FIGS. 26A and 26B are sectional views showing states when the bank-shaped pattern and an auxiliary bank are provided in the conventional liquid crystal display device.
Figure 26B:
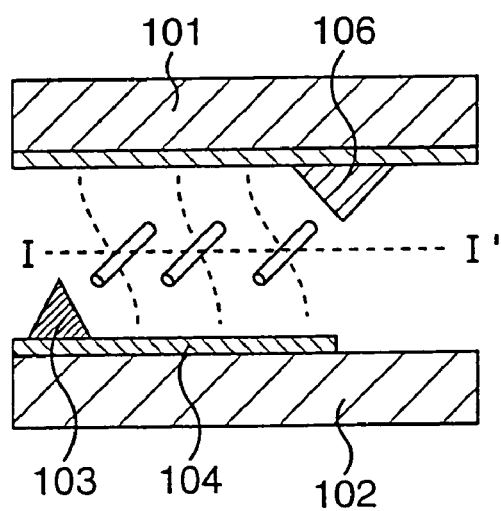
Figure 27A:
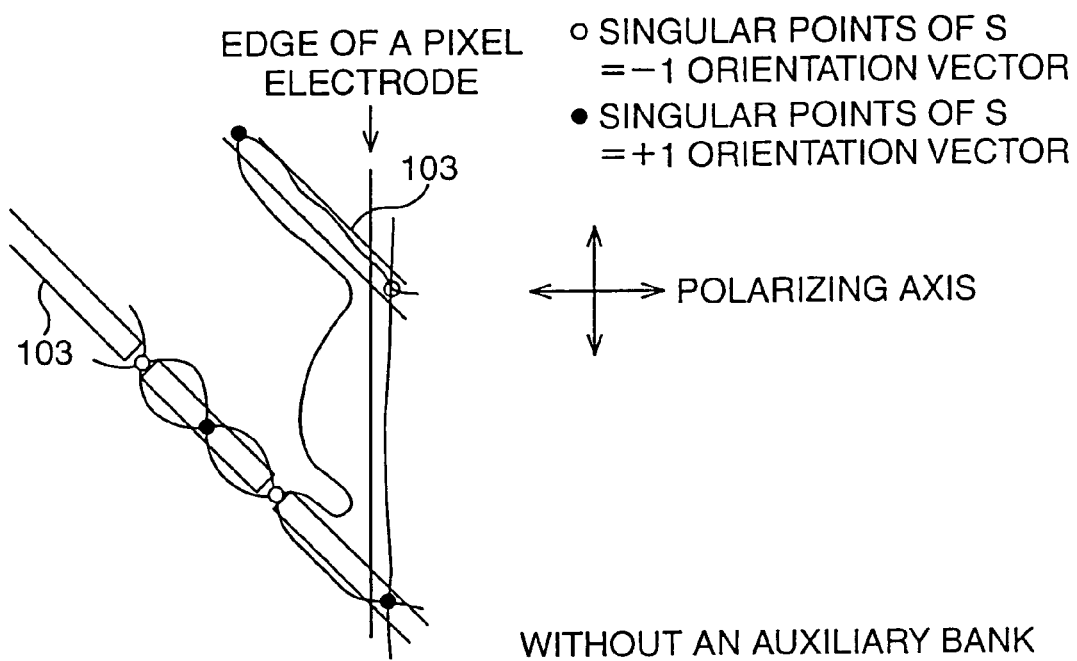
FIGS. 27A and 27B are plane views showing states near the pixel in the conventional liquid crystal display device according to the MVA system.
Figure 27B:
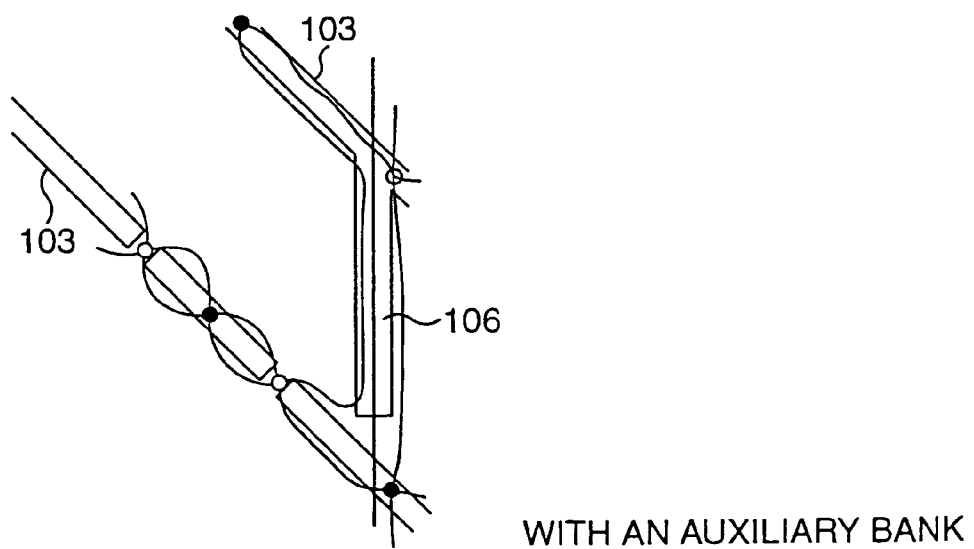
Figure 28:
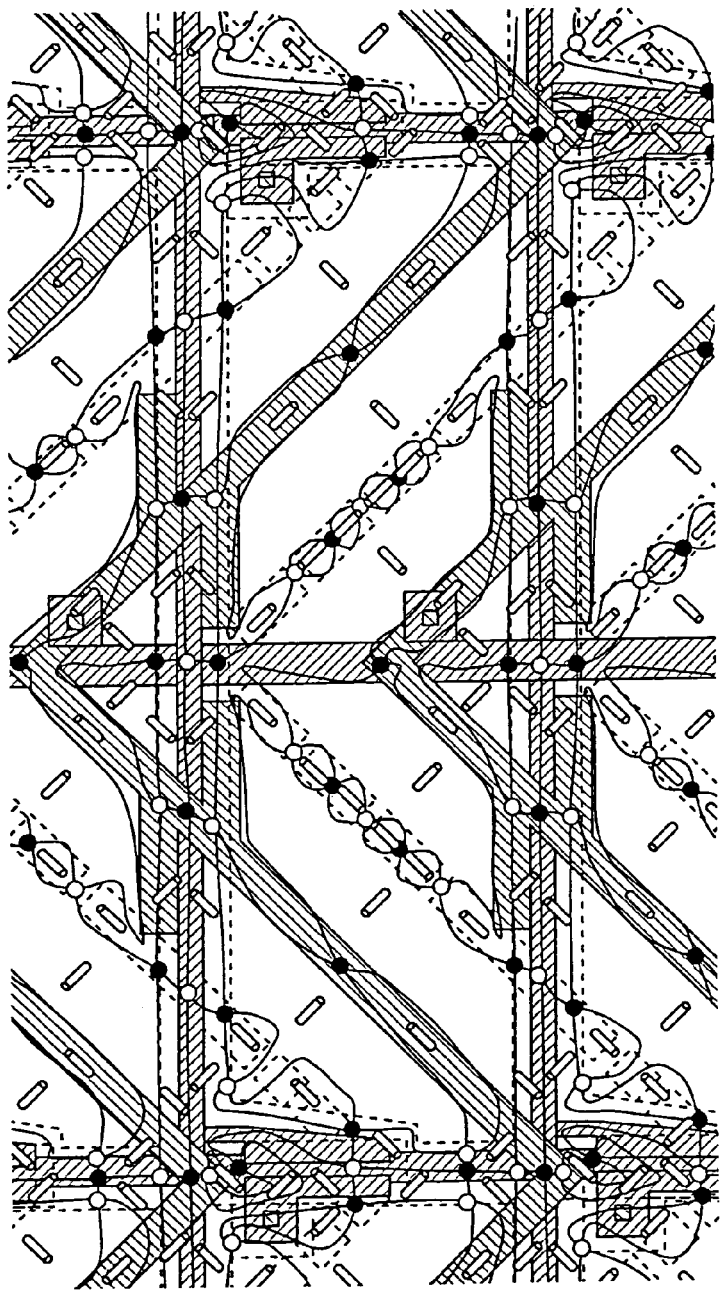
FIG. 28 is a plane view showing distribution of singular points and dark lines on a whole pixel.
Figure 29A:
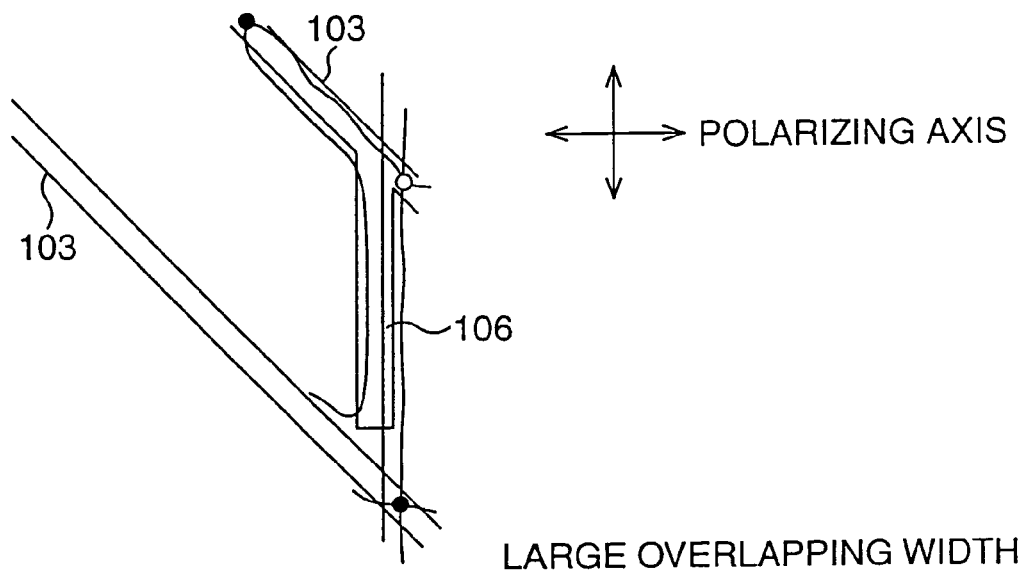
FIGS. 29A and 29B are plane views showing overlapping states of the auxiliary bank and a pixel edge.
Figure 29B:
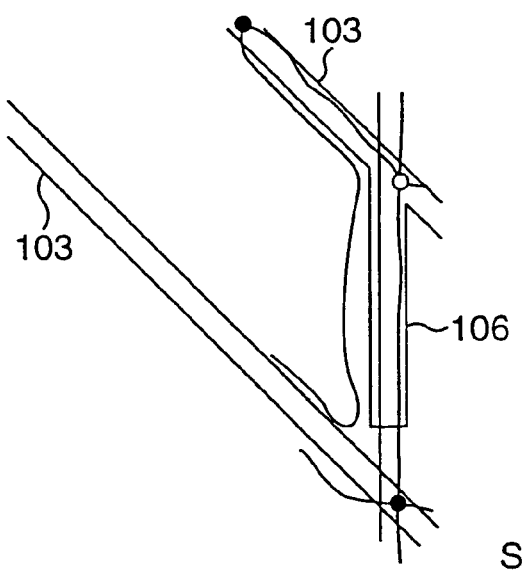
Figure 30:
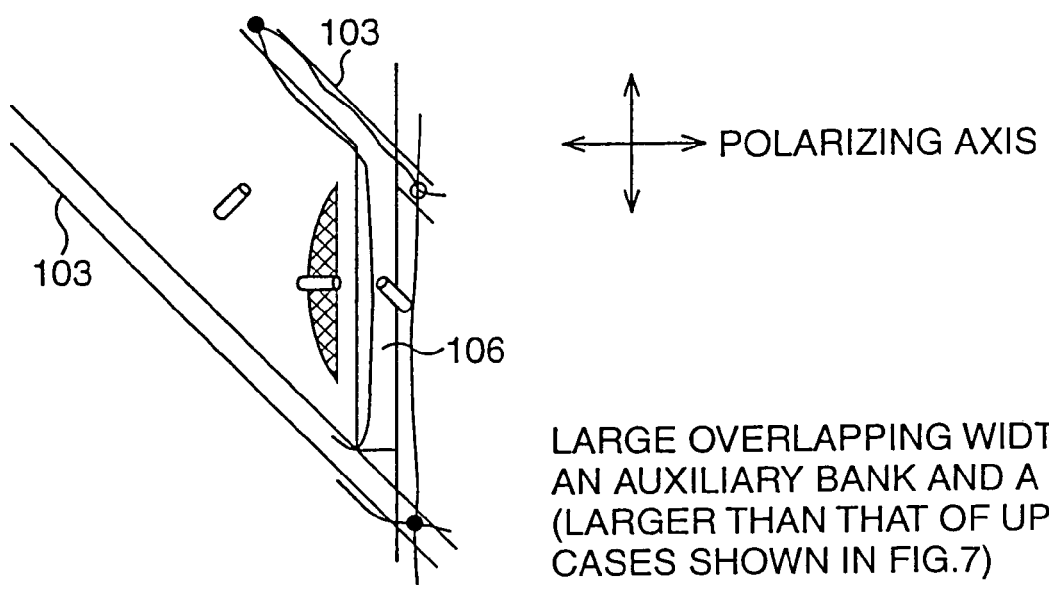
FIG. 30 is a plane view showing an overlapping state of the auxiliary bank and the pixel edge.

Meanwhile, on the surface of the transparent glass substrate 12 as the CF substrate, a slit pattern 31, which is an orientation control element extending in the oblique direction relative to the edge of the pixel electrode 15 on the opposed transparent glass substrate 11, is formed in the common electrode to extend substantially in parallel to the extending direction of the slit pattern 23. Thereby, predetermined division is performed on each pixel of the liquid crystal layer 13. For example, the four divided orientation is performed when parts of pixel are arranged in one pixel, as in FIG. 22.

Figure 14B:
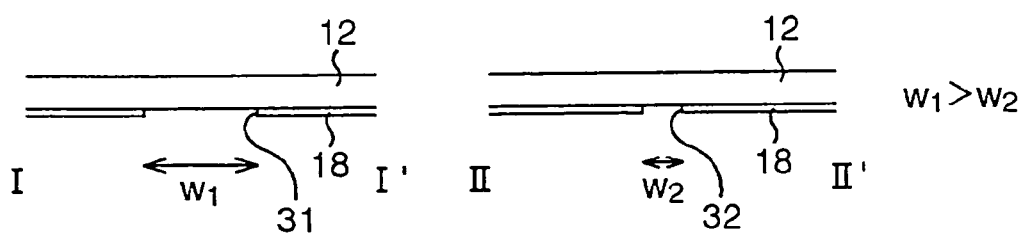

Moreover, on the surface of the transparent glass substrate 12, a slit pattern 32 is integrally formed with the slit pattern 31 along the edge of the pixel electrode 15 to branch off in an oblique direction from the slit pattern 31 as shown in FIG. 14A and FIG. 14B (sectional views taken along the I–I' line and II–II' line). The slit pattern 32 is formed to be smaller in width than the slit pattern 31.

Figure 15A:
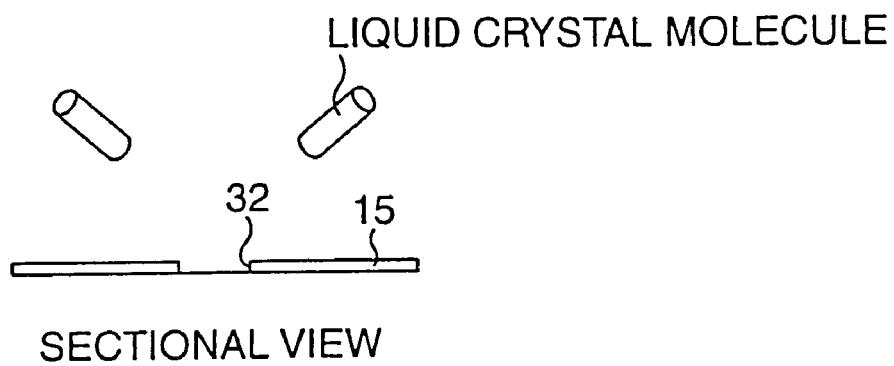
FIGS. 15A and 15B show states of liquid crystal orientation.
Figure 15B:
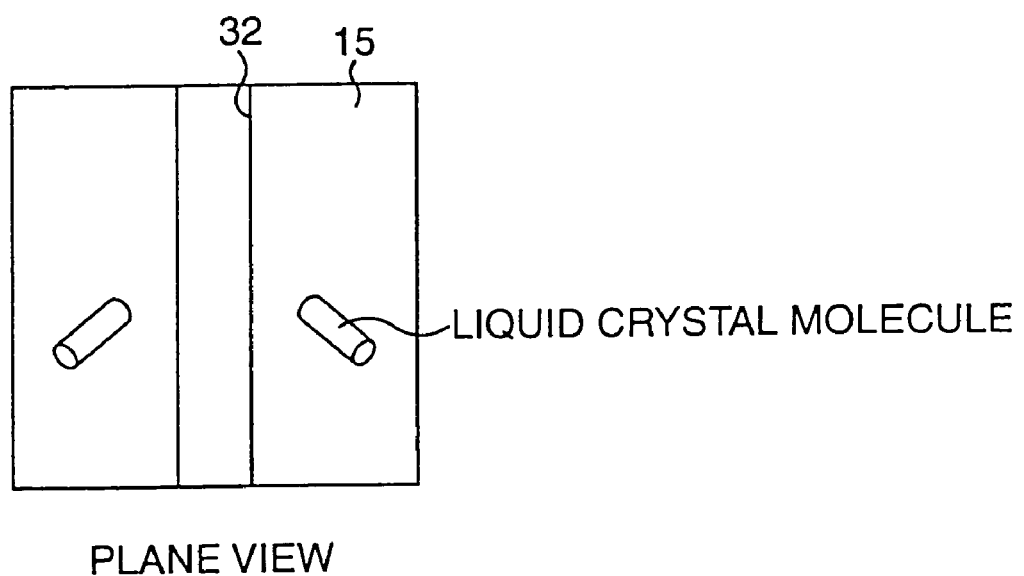

As a result, an orientation control defined by the slit pattern 32 is weaker in strength than the orientation control defined by the slit pattern 23 in the pixel electrode 15 as shown in FIG. 15A and FIG. 15B. At this time, the liquid crystal orientation defined by the slit pattern 32 is oriented to deviate from a perpendicular direction relative to the extending direction of the slit pattern 23. In this way, an ideal state in which the liquid crystal molecules are oriented in the direction of approximately 45° relative to the slit pattern 32 and in the perpendicular direction relative to the slit pattern 23 in the pixel electrode 15 is stably realized.

[Specific Example of Structure]

As shown in FIGS. 14A and 14B, the slit pattern 23 for controlling the liquid crystal orientation is formed in the pixel electrode 15 on the transparent glass substrate (the TFT substrate) 11 having the pixel electrodes, the active element (TFT), the data bus lines, the gate bus line, and so on. On the transparent glass substrate (the CF substrate) 12 having the common electrode and so on, the slit pattern 31 for controlling the liquid crystal orientation and the slit pattern 32 for auxiliary control provided along the edge of the pixel electrode are formed in the common electrode. The slit pattern 32 on the CF substrate is smaller in width than the slit pattern 31 which is arranged to extend in a nonparallel direction and in a non-vertical direction relative to the edge.

A TFT substrate with a 15-inch type screen and a pixel number of 1024×768 (XGA) is utilized. A pixel pitch is 297 µm. The slit pattern 23 on the TFT substrate is formed to extend in the direction of approximately 45° relative to the edge of the pixel electrode. The slit width thereof is 10 µm. As for the slit patterns on the CF substrate, the slit pattern 31 is formed to extend in the direction of 45° relative to the edge of the pixel electrode and the slit pattern 32 is formed along the edge of the pixel electrode. The slit pattern 31 is 10 µm in width and the slit pattern 32 is 5 µm in width. An overlapping margin of the slit pattern 32 and the pixel electrode is 5 µm.

Oriented films are formed and coated over the surfaces of the substrates thus fabricated. Here, the substrates are spin-coated with oriented film material thereon, pre-baked at 80° C. for one minute (using a hotplate), and thereafter, subjected to permanent baking at 180° C. for 60 minutes (using a clean oven). The substrates on which the oriented films are formed in this way are pasted with each other in a manner in which the slit patterns deviate from each other by a half pitch to fabricate an empty cell. A cell gap is 4 µm and a distance of each spaced interval part between each slit pattern is 25 µm. To the empty cell thus fabricated, liquid crystal material is injected and after various processes the liquid crystal display device is completed.

As explained above, according to this embodiment, the orientation abnormality within the pixel region for display caused by the slanting electric field which occurs outside the pixel region for display and in its vicinity is suppressed and the liquid crystal orientation is controlled to be in a stable and ideal state. Thereby, irregular display or ununiformity in display brightness is prevented from occurring and the light transmittance of the panel is greatly improved. This makes it possible to realize a liquid crystal display device. with high reliability.

Modification

A modification of the fourth embodiment will be described below.

In this modification, bank-shaped patterns instead of the slit patterns are formed as orientation control elements on the CF substrate in the liquid crystal display device according to the fourth embodiment.

Figure 16A:
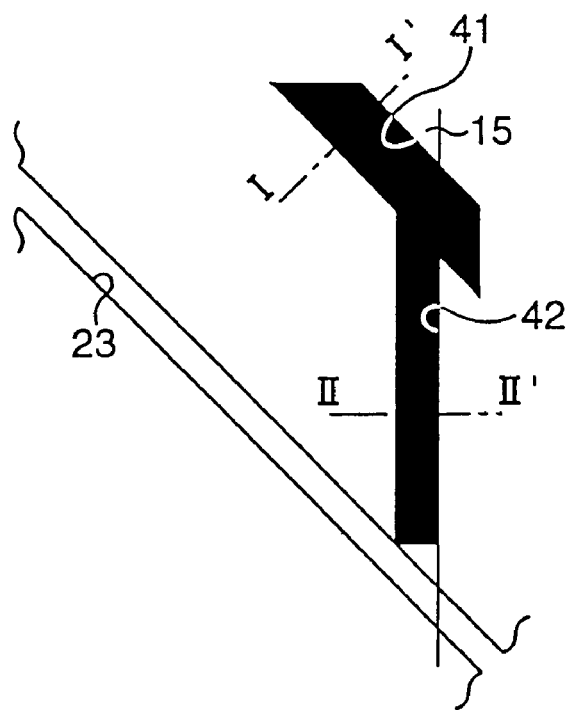
FIGS. 16A and 16B are schematic views showing states near a pixel in a modification of the liquid crystal display device according to the fourth embodiment.

In the liquid crystal display device, as shown in FIG. 16A, the slit pattern 23, which is the orientation control element extending in the oblique direction relative to the edge of the pixel electrode 15, is formed in the pixel electrode 15 on the surface of the transparent glass substrate 11 as the TFT substrate.

Incidentally, in this case, a bank-shaped pattern, which is a linear protrusion, may be formed instead of the slit pattern 23 in the same position where the slit pattern 23 is formed.

Meanwhile, on the surface of the transparent glass substrate 12 as the CF substrate, a bank-shaped (linear protrusion) pattern 41, which is an orientation control element extending in the oblique direction relative to the edge of the pixel electrode 15 on the opposed transparent glass substrate 11, is formed on the common electrode to extend substantially in parallel to the extending direction of the slit pattern 23. Consequently, predetermined division, for example, the four divided orientation, is performed on each pixel of the liquid crystal layer 13.

Figure 16B:
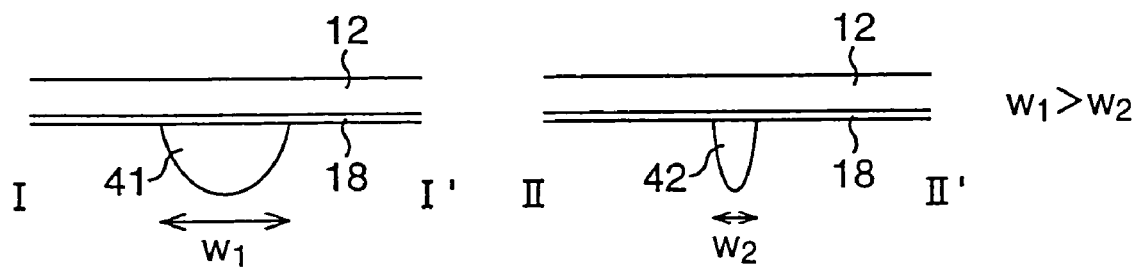

Moreover, on the surface of the transparent glass substrate 12, a bank-shaped pattern 42 is integrally formed with the bank-shaped pattern 41 along the edge of the pixel electrode 15 to branch off in an oblique direction from the bank-shaped pattern 41 as shown in FIG. 16A and FIG. 16B (sectional views taken along the I–I' line and II–II' line). The bank-shaped pattern 42 is formed to be smaller in width than the bank-shaped pattern 41.

Figure 17A:
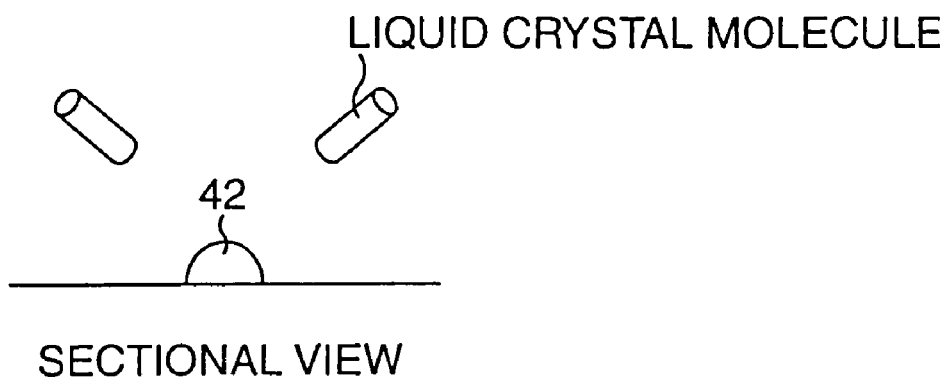
FIGS. 17A and 17B are schematic views showing states of liquid crystal orientation.
Figure 17B:
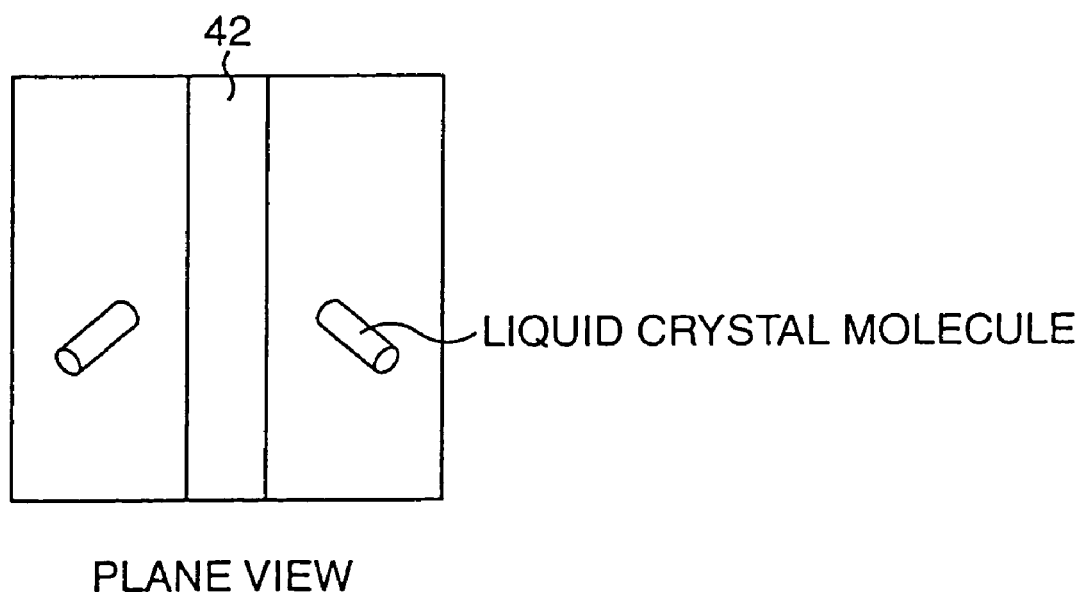

As a result, orientation control defined by the bank-shaped pattern 42 is weaker in strength than the orientation control defined by the slit pattern 23 in the pixel electrode 15 as shown in FIG. 17A and FIG. 17B. At this time, the liquid crystal orientation defined by the bank-shaped pattern 42 is oriented to deviate from a perpendicular direction relative to the extending direction of the slit pattern 23. Thus, an ideal state in which the liquid crystal molecules are oriented in the direction of approximately 45° relative to the bank-shaped pattern 42 and in the perpendicular direction relative to the slit pattern 23 in the pixel electrode 15 can be stably realized.

[Specific Example of Structure]

The structure of this example is the same as the specific structure in the fourth embodiment except in the following point.

As shown in FIGS. 16A and 16B, the bank-shaped patterns are formed on the CF substrate side. Two types of the bank-shaped patterns are provided. One of them extends in the direction of 45° relative to the edge of the pixel electrode 15 (the bank-shaped pattern 41) and the other one extends along the edge of the pixel electrode 15 (the bank-shaped pattern 42). They are different in width. The bank-shaped pattern 41 is 10 μm in width and the bank-shaped pattern 42 is 3 μm in width. An overlapping width of the bank-shaped pattern 42 and the pixel electrode 15 is 5 μm.

A photosensitive acrylic resin PC-335 (manufactured by JSR) is used for material for the bank-shaped patterns. The bank-shaped patterns are formed in a manner in which the substrate is spin-coated with the resin thereon, baked at 90° C. for 20 minutes (using a clean oven), selectively irradiated with ultraviolet rays using a photomask, developed with an organic alkali type developing solution (TMAHO 0.2 wt % aqueous solution), and baked at 200° C. for 60 minutes (using the clean oven). The CF substrate on which the bank-shaped patterns are formed is subjected to ashing treatment, and thereafter, a vertically oriented film is coated thereon. The ashing treatment is performed in an oxygen plasma atmosphere with electric power of 500 W being applied for approximately one minute.

As explained above, according to this modification, the orientation abnormality within the pixel region for display caused by the slanting electric field which occurs outside the pixel region for display and in its vicinity is suppressed and the liquid crystal orientation is controlled to be in a stable and ideal state. Consequently, irregular display or ununiformity in display brightness is prevented from occurring and the light transmittance of the panel is greatly enhanced. This makes it possible to realize a liquid crystal display device with high reliability.

Note that characteristics of the fourth embodiment and its modification example are that the orientation control elements are changed in their widths and shapes. Therefore, other conditions such as the overlapping width with the edge of the pixel electrode 15 is not restrictive of the present invention.

Fifth Embodiment

The fifth embodiment of the present invention will be described below. Here, a liquid crystal display device based on the MVA system like in the fourth embodiment will be described. But, an orientation control given near the edge of the pixel electrode is performed in a different way.

Like in the first embodiment schematically shown in FIG. 1, this liquid crystal display device is composed of a pair of transparent glass substrates 11, 12 facing each other with a predetermined spaced interval being provided therebetween and the liquid crystal layer 13 interposed between the transparent glass substrates 11, 12. On the transparent glass substrate 11, the pixel electrode 15, the data bus lines 21, the gate bus line (not shown), and so on are formed. On the transparent glass substrate 12, the color filter 17, the common electrode 18, and so on are formed.

Figure 18A:
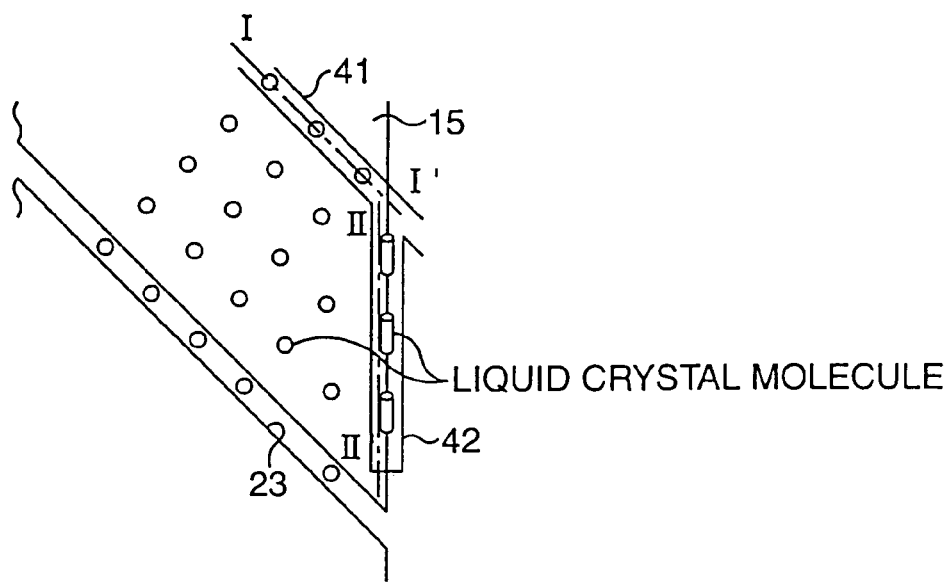
FIGS. 18A and 18B are schematic views showing states near a pixel in a liquid crystal display device according to the fifth embodiment of the present invention.

In the liquid crystal display device, as shown in FIG. 18A, the slit pattern 23, which is the orientation control element extending in the oblique direction relative to the edge of the pixel electrode 15, is formed in the pixel electrode 15 on the surface of the transparent glass substrate 11 as the TFT substrate.

Incidentally, in this case, a bank-shaped pattern, which is a linear protrusion, may be formed instead of the slit pattern 23 in the same position where the slit pattern 23 is formed.

Meanwhile, on the surface of the transparent glass substrate 12 as the CF substrate, the bank-shaped (linear protrusion) pattern 41, which is the orientation control element extending in the oblique direction relative to the edge of the pixel electrode 15 on the opposed transparent glass substrate 11, is formed on the common electrode to extend substantially in parallel to the slit pattern 23. Thereby, predetermined division, for example, the four divided orientation, is performed on each pixel of the liquid crystal layer 13.

Figure 18B:
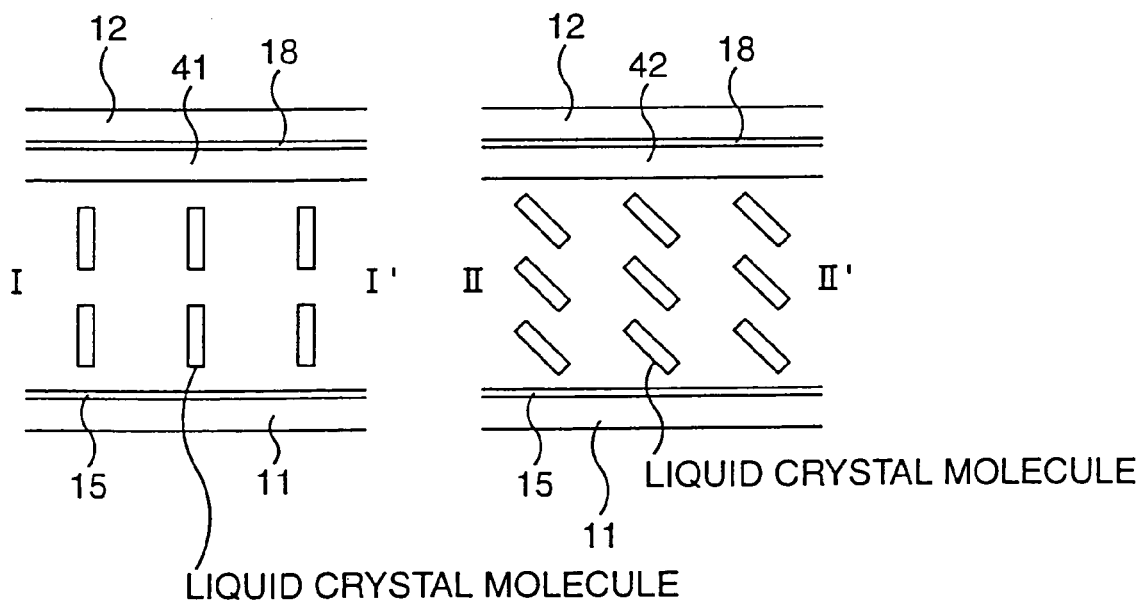

Moreover, on the surface of the transparent glass substrate 12, the bank-shaped pattern (an auxiliary bank) 42 is integrally formed with the bank-shaped pattern 41 along the edge of the pixel electrode 15 to branch off in the oblique direction from the bank-shaped pattern 41 as shown in FIG. 18A and FIG. 18B (sectional views taken along the I–I' line and the II–II' line). The liquid crystal molecules of the liquid crystal layer 13 on the bank-shaped pattern 42 are non-vertically oriented when no voltage is being applied between the pixel electrode 15 of the TFT substrate and the common electrode 18 of the CF substrate.

Incidentally, in this case, slit patterns, which are linear protrusions, may be provided instead of the bank-shaped patterns 41, 42 in the same positions where the bank-shaped patterns 41, 42 are formed.

Here, the liquid crystal orientation direction is the same as an orientation direction of the liquid crystal molecules which causes the dark line to occur under voltage application, that is, a parallel direction to the extending direction of the bank-shaped pattern 42. Thus, the dark line occurs stably only on the bank-shaped pattern 42 on which the liquid crystal molecules are non-vertically oriented in advance. Consequently, an actual adverse effect due to an occurrence of the dark line is eliminated.

(Specific Example of Structure)

The structure of this example is the same as the specific structure in the fourth embodiment except in the following point.

As shown in FIGS. 18A and 18B, the liquid crystal molecules on the bank-shaped pattern 42 disposed along the edge of the pixel electrode 15 are non-vertically oriented. The non-vertical orientation is realized by repelling the oriented film coated on the bank-shaped pattern 42 with the ashing treatment not being applied selectively only on the bank-shaped pattern 42. The bank-shaped pattern 42 is 10 μm in width. The overlapping margin of the bank-shaped pattern 42 and the pixel electrode 15 is 4 μm.

Note that the characteristic of this embodiment is that the liquid crystal orientation on the bank-shaped pattern 42 is made non-vertical. Therefore, other conditions such as the overlapping width with the edge of the pixel electrode 15 are not restrictive of the present invention.

As explained above, according to this embodiment, the orientation abnormality within the pixel region for display caused by the slanting electric field which occurs outside the pixel region for display and in its vicinity is suppressed and the liquid crystal orientation is controlled to be in a stable and ideal state. Thereby, irregular display or ununiformity in display brightness is prevented from occurring and the light transmittance of the panel is enhanced to a great extent. This makes it possible to realize a liquid crystal display device with high reliability.

Sixth Embodiment

The sixth embodiment of the present invention will be described below. Here, a liquid crystal display device based on the MVA system will be described like in the fourth embodiment but the orientation control provided near the edge of the pixel electrode is performed in a different way.

Like in the first embodiment schematically shown in FIG. 1, this liquid crystal display device is composed of a pair of transparent glass substrates 11, 12 facing each other with a predetermined spaced interval being provided therebetween and the liquid crystal layer 13 interposed between the transparent glass substrates 11, 12. On the transparent glass substrate 11, the pixel electrodes 15, the data bus lines 21, the gate bus line (not shown), and so on are formed. On the transparent glass substrate 12, the color filter 17, the common electrode 18, and so on are formed.

Figure 19A:
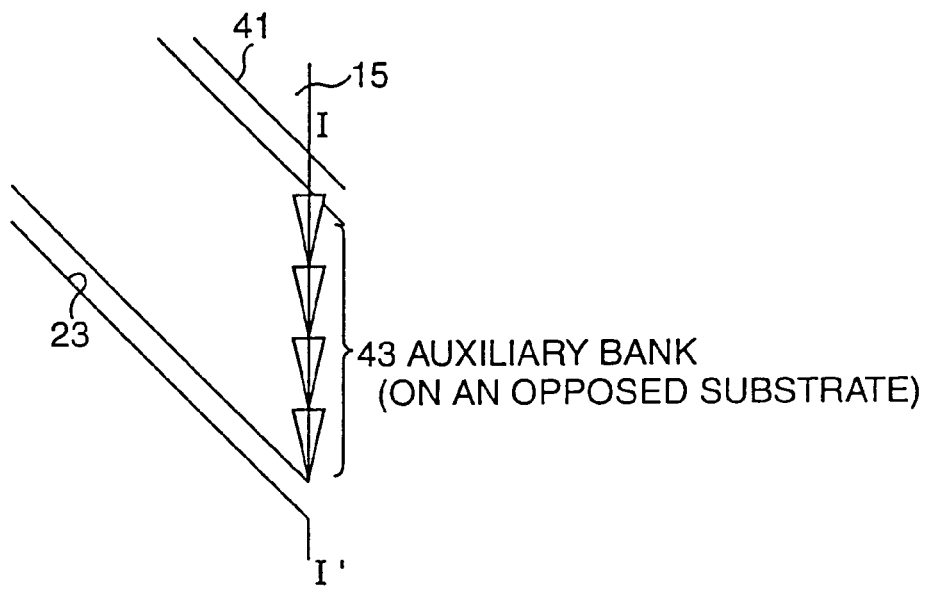
FIGS. 19A and 19B are schematic views showing states near a pixel in a liquid crystal display device according to the sixth embodiment of the present invention.

In the liquid crystal display device, as shown in FIG. 19A, the slit pattern 23, which is the orientation control element extending in the oblique direction relative to the edge of the pixel electrode 15, is formed in the pixel electrode 15 on the surface of the transparent glass substrate 11 as the TFT substrate.

Incidentally, in this case, a bank-shaped pattern, which is a linear protrusion, may be formed instead of the slit pattern 23 in the same position where the slit pattern 23 is formed.

Meanwhile, on the surface of the transparent glass substrate 12 as the CF substrate, the bank-shaped (linear protrusion) pattern 41, which is the orientation control element extending in the oblique direction relative to the edge of the pixel electrode 15 on the opposed transparent glass substrate 11, is formed on the common electrode to extend substantially in parallel to the extending direction of the slit pattern 23. Thereby, predetermined division, for example, the four divided orientation, is performed on each pixel of the liquid crystal layer 13.

Figure 19B:
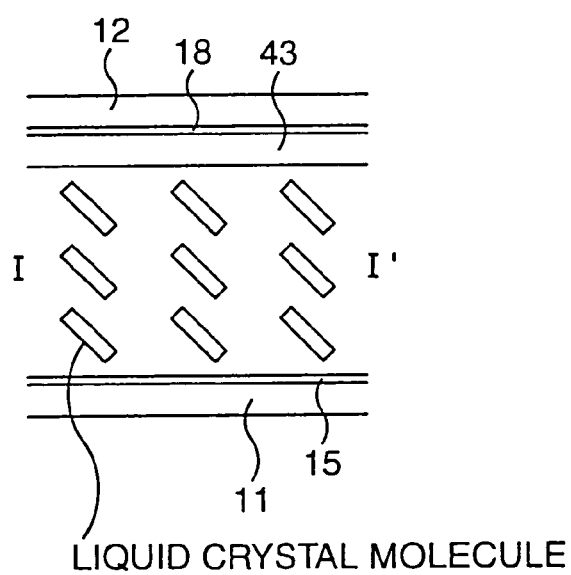

Moreover, on the surface of the transparent glass substrate 12, as shown in FIG. 19A and FIG. 19B (a sectional view taken along the I–I' line), a bank-shaped pattern (an auxiliary bank) 43, which is an assembly of protrusions having shapes with directivity along the edge of the pixel electrode 15, a triangle-shaped section here, and being tapered toward an opposite side of the bank-shaped pattern 41, is integrally formed with the bank-shaped pattern 41 to branch off in the oblique direction from the bank-shaped pattern 41.

Incidentally, in this case, slit patterns may be provided instead of the bank-shaped patterns 41, 43 in the same positions where the bank-shaped patterns 41, 43 are formed.

Here, the direction of the directivity defined by the bank-shaped pattern 43 is the same as the orientation direction of the liquid crystal molecules which causes the dark line to occur under voltage application, that is, a parallel direction to the extending direction of the bank-shaped pattern 43. Thereby, under voltage application, the dark line occurs stably only on the bank-shaped pattern 43 which has the directivity. Consequently, an actual adverse effect due to an occurrence of the dark line is eliminated and an actually high light transmittance of the panel can be realized.

[Specific Example of Structure]

The structure of this example is the same as the specific structure in the fourth embodiment except in the following point.

As shown in FIGS. 19A and 19B, the bank-shaped pattern 43 which is disposed along the edge of the pixel electrode 15 is shaped to have the directivity in a parallel direction to the substrate's plane surface. An isosceles triangle-shaped section is used as the shape with the directivity. The base of the triangle is 5 μm and the height is 9 μm. The triangles (four in this embodiment) are arranged being connected with each other. An overlapping margin of the bank-shaped pattern 43 and the pixel electrode 15 is 4 μm.

The bank-shaped pattern 43 having the directivity needs to be arranged to have directivity toward an outer direction from the bank-shaped pattern 41 which extends in the direction of 45° relative to the edge of the adjacent pixel electrode 15. This arrangement makes it possible to realize orientation control by which the dark line is allowed to occur stably on the position of the bank-shaped pattern 43.

Note that the characteristic of this embodiment is that the bank-shaped pattern along the edge of the pixel electrode has the directivity. Therefore, other conditions such as the overlapping width with the edge are not restrictive of the present invention.

Figure 20A:
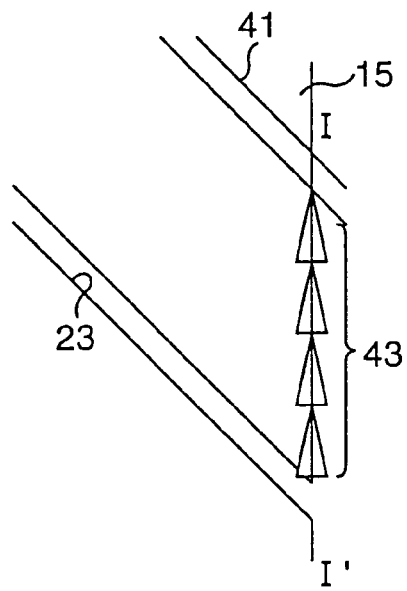
FIGS. 20A and 20B are schematic views showing states near a pixel in another example of the liquid crystal display device according to the sixth embodiment.
Figure 20B:
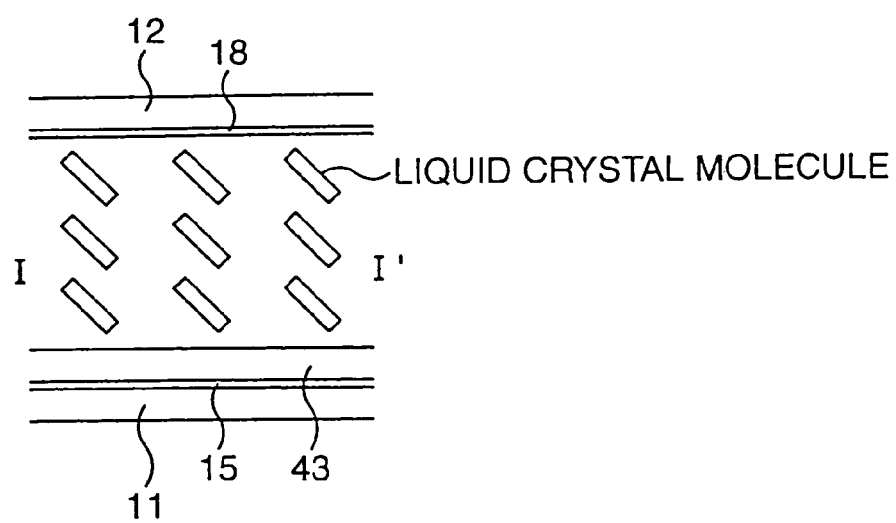

Incidentally, as shown in FIG. 20A and FIG. 20B (a sectional view taken along the line I–I'), the bank-shaped pattern 43 having the directivity may be disposed not on the CF substrate but on the TFT substrate. Furthermore, it is also appropriate that the bank-shaped pattern 43 is disposed on both of the substrates. In this case, the bank-shaped pattern 43 has a triangle-shaped section and in contrast to the case in FIG. 19A, is tapered toward the bank-shaped pattern 41.

Seventh Embodiment

The seventh embodiment of the present invention will be described below. Here, a liquid crystal display device based on the MVA system like in the fourth embodiment will be described. But, an orientation control provided near the edge of the pixel electrode is performed in a different way.

Like in the first embodiment schematically shown in FIG. 1, this liquid crystal display device is composed of a pair of transparent glass substrates 11, 12 facing each other with a predetermined spaced interval being provided therebetween and the liquid crystal layer 13 interposed between the transparent glass substrates 11, 12. On the transparent glass substrate 11, the pixel electrodes 15, the data bus lines 21, the gate bus line (not shown), and so on are formed. On the transparent glass substrate 12, the color filter 17, the common electrode 18, and so on are formed.

Figure 21A:
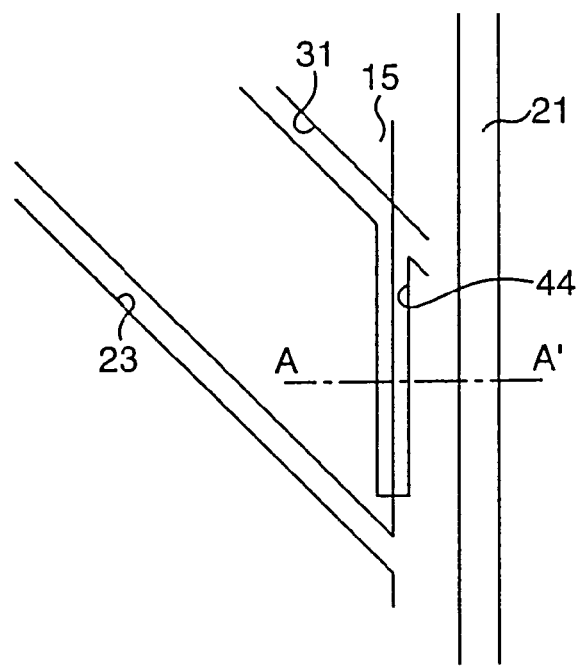
FIGS. 21A and 21B are schematic views showing states near a pixel in a liquid crystal display device according to the seventh embodiment of the present invention.

In the liquid crystal display device, as shown in FIG. 21A, the slit pattern 23, which is the orientation control element extending in the oblique direction relative to the edge of the pixel electrode 15, is formed in the pixel electrode 15 on the surface of the transparent glass substrate 11 as the TFT substrate.

Incidentally, in this case, a bank-shaped pattern, which is a linear protrusion, may be formed instead of the slit pattern 23 in the same position where the slit pattern 23 is formed.

Meanwhile, on the surface of the transparent glass substrate 12 as the CF substrate, the slit pattern 31, which is the orientation control element extending in the oblique direction relative to the edge of the pixel electrode 15 on the opposed transparent glass substrate 11, is formed in the common electrode to extend substantially in parallel to the extending direction of the slit pattern 23. Thereby, predetermined division, for example, the four divided orientation, is performed on each pixel of the liquid crystal layer 13.

Figure 21B:
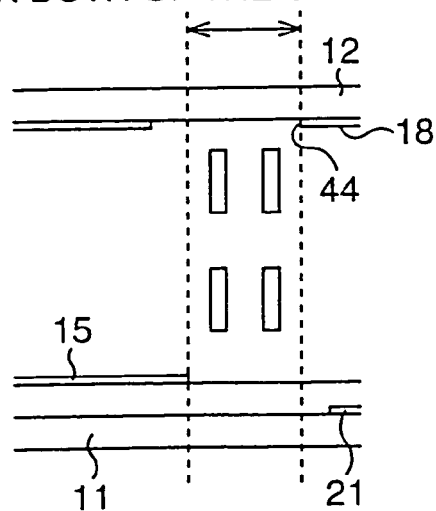

Moreover, on the surface of the transparent glass substrate 12, the slit pattern 44 is integrally formed with the slit pattern 31 along the edge of the pixel electrode 15 to branch off in the oblique direction from the slit pattern 31 as shown in FIG. 21A and FIG. 21B.

Incidentally, in this case, bank-shaped patterns, which are linear protrusions, may be provided instead of the slit patterns 31, 44 in the same positions where the slit patterns 31, 44 are formed.

Here, at least a part of the liquid crystal molecules of the liquid crystal layer 13 on the slit pattern 44 are vertically oriented when voltage is being applied between the pixel electrode 15 and the common electrode 18. Specifically, no pixel electrode 15 exists at least on a part of a place facing the slit pattern 44 on the CF substrate.

One of the causes which strengthen the slanting electric field of the pixel electrode 15, which is one factor of causing unevenness among each shot at the time of patterning, is an influence from an electric field of an adjacent data bus line. In this embodiment, a region in which the liquid crystal orientation does not change (remains in the vertical direction) is provided between the data bus line 21 and the pixel electrode 15 so that the influence given to the liquid crystal orientation on the pixel electrode 15 by the bus line can be eliminated. As a result, the slanting electric field of the edge of the pixel electrode 15 can be weakened and the unevenness among each shot can be prevented from occurring.

[Specific Example of Structure]

The structure of this example is the same as the specific structure in the fourth embodiment except in the following point.

As shown in FIGS. 21A and 21B, the slit pattern 31, which is disposed to extend in the direction of 45° relative to the edge of the pixel electrode 15, and the slit pattern 44, which is disposed to extend along the edge of the pixel electrode 15, are both 10 μm in width and an overlapping width of the data bus line 21 and the slit pattern 44 is 2 μm.

The distance between the pixel electrode 15 and the adjacent data bus line 21 is 10 μm. This means that a region of 8 μm with no electrode exists between the pixel electrode 15 and the data bus line 21. Consequently, with no electrode existing in the region, the liquid crystal molecules maintain their vertical orientation state in this region even when voltage is being applied to the electrodes in their vicinity.

Moreover, when an insulating film is selectively formed in the region without any electrode existing therein, thickness of a cell in this region is made thinner than that in other regions. Thereby, the vertical orientation state can be more stably realized.

Note that the characteristic of this embodiment is that the liquid crystal molecules between the pixel electrode and the bus line are maintained in the vertical orientation state under voltage application. Therefore, other conditions such as an overlapping width with the pixel edge is not restrictive of this invention.

As explained above, according to this embodiment, the orientation abnormality within the pixel region for display caused by the slanting electric field which occurs outside the pixel region for display and in its vicinity is suppressed and the liquid crystal orientation is controlled to be in a stable and ideal state. Thereby, irregular display or ununiformity in display brightness is prevented from occurring and the light transmittance of the panel is greatly enhanced. This makes it possible to realize a liquid crystal display device with high reliability.

According to the present invention, the orientation abnormality within the pixel region for display caused by the slanting electric field which occurs outside the pixel region for display and in its vicinity is suppressed and the liquid crystal orientation is controlled to be in a stable and ideal state. Thereby, irregular display or ununiformity in display brightness is prevented from occurring and the light transmittance of the panel is greatly enhanced. This makes it possible to realize a liquid crystal display device with high reliability.

What is claimed is:

1. A liquid crystal display device comprising:
    a first substrate having thereon a pixel electrode and an active element;
    a second substrate having thereon an opposed electrode; and
    a liquid crystal layer interposed between said first and second substrates with said electrodes facing each other,
    wherein a first orientation control element extending in a nonparallel direction relative to an extending direction of an edge of said pixel electrode and a second orientation control element extending in a parallel direction relative to an extending direction of said edge are provided on at least one of said first and second substrates,
    wherein said second orientation control element is constituted by an assembly of distinct plural orientation control elements having a same directivity in a direction of the substrate's plane surface, and
    wherein said assembly is entirely formed between adjacent repetitions of said first orientation control element.

2. The device according to claim 1, wherein said second orientation control element is formed to extend in an outer direction from said first orientation control element which is adjacent to said second orientation control element on the same substrate.

3. The device according to claim 1, wherein at least one of said first and second orientation control elements is a slit formed in said pixel electrode or said opposed electrode.

4. The device according to claim 1, wherein at least one of said first and second orientation control elements is a protrusion formed on said pixel electrode or said opposed electrode.

5. The device according to claim 1, wherein a dielectric anisotropy of said liquid crystal molecules of said liquid crystal layer is negative.

6. The device according to claim 1, wherein each individual orientation control element of said assembly has a same shape.

7. The device according to claim 1, wherein all individual orientation control elements of said assembly are arranged in a single line.

8. The device according to claim 1, wherein said assembly comprises a series of triangular shapes, when looking perpendicular to said substrates, all of said triangular shapes pointing in a same direction.

* * * * *